United States Patent
Duvaut et al.

(10) Patent No.: US 7,068,592 B1
(45) Date of Patent: Jun. 27, 2006

(54) SYSTEM AND METHOD FOR INCREASING PAYLOAD CAPACITY BY CLUSTERING UNLOADED BINS IN A DATA TRANSMISSION SYSTEM

(75) Inventors: Patrick Duvaut, Eatontown, NJ (US); William E. Keasler, Tonton Falls, NJ (US); Laurent Pierrugues, Keansburg, NJ (US)

(73) Assignee: Conexant, Inc., Red Bank, NJ (US)

( * ) Notice: Subject to any disclaimer, the term of this patent is extended or adjusted under 35 U.S.C. 154(b) by 980 days.

(21) Appl. No.: 09/997,662

(22) Filed: Nov. 29, 2001

Related U.S. Application Data

(60) Provisional application No. 60/289,995, filed on May 10, 2001.

(51) Int. Cl.
*H04J 11/00* (2006.01)
(52) U.S. Cl. ........................ 370/203; 370/484
(58) Field of Classification Search ............... 370/203, 370/210, 208, 484
See application file for complete search history.

(56) References Cited

U.S. PATENT DOCUMENTS

| | | | | |
|---|---|---|---|---|
| 5,606,575 A | * | 2/1997 | Williams | 375/219 |
| 5,914,933 A | * | 6/1999 | Cimini et al. | 370/208 |
| 6,122,247 A | * | 9/2000 | Levin et al. | 370/210 |
| 6,243,414 B1 | | 6/2001 | Drucker et al. | 375/222 |
| 6,795,392 B1 | * | 9/2004 | Li et al. | 370/210 |

OTHER PUBLICATIONS

A Mathematical Theory if Communication C.E. Shannon; Jul. Oct. 1948; pp. 1-55.
Statistical Mechanics of Error-Correcting Codes Y. Kabashima & D. Saad; Jan. 1999; pp. 97-103.
A New Class of Efficient Block-Iterative Inteference Cancellation Techniques for Digital Communication Receivers A.M. Chan & G.W. Wornell; Oct. 2000; pp. 1-12.
An Adaptive Algorithm for Antenna Array Low-Rank Processing in Cellular TDMA Base Stations M. Martone; May 1998; pp. 627-643.

* cited by examiner

*Primary Examiner*—Chi Pham
*Assistant Examiner*—Blanche Wong
(74) *Attorney, Agent, or Firm*—Thomas, Kayden, Horstemeyer & Risley

(57) ABSTRACT

A system and method for increasing payload in a data transmission system. In architecture, the system comprises a modulation device configured to modulate data bins to produce bin-clusters, a mechanism to load the bin-clusters with data, a transmitter configured to transmit the loaded bin-clusters, a receiver configured to receive the transmitted bin-clusters, and a demodulation device configured to extract data from the received bin-clusters.

The method steps comprise the steps of modulating data bins to produce bin-clusters, loading the bin-clusters with data, transmitting the loaded bin-clusters, receiving the transmitted bin-clusters, and extracting data from the received bin-clusters.

57 Claims, 23 Drawing Sheets

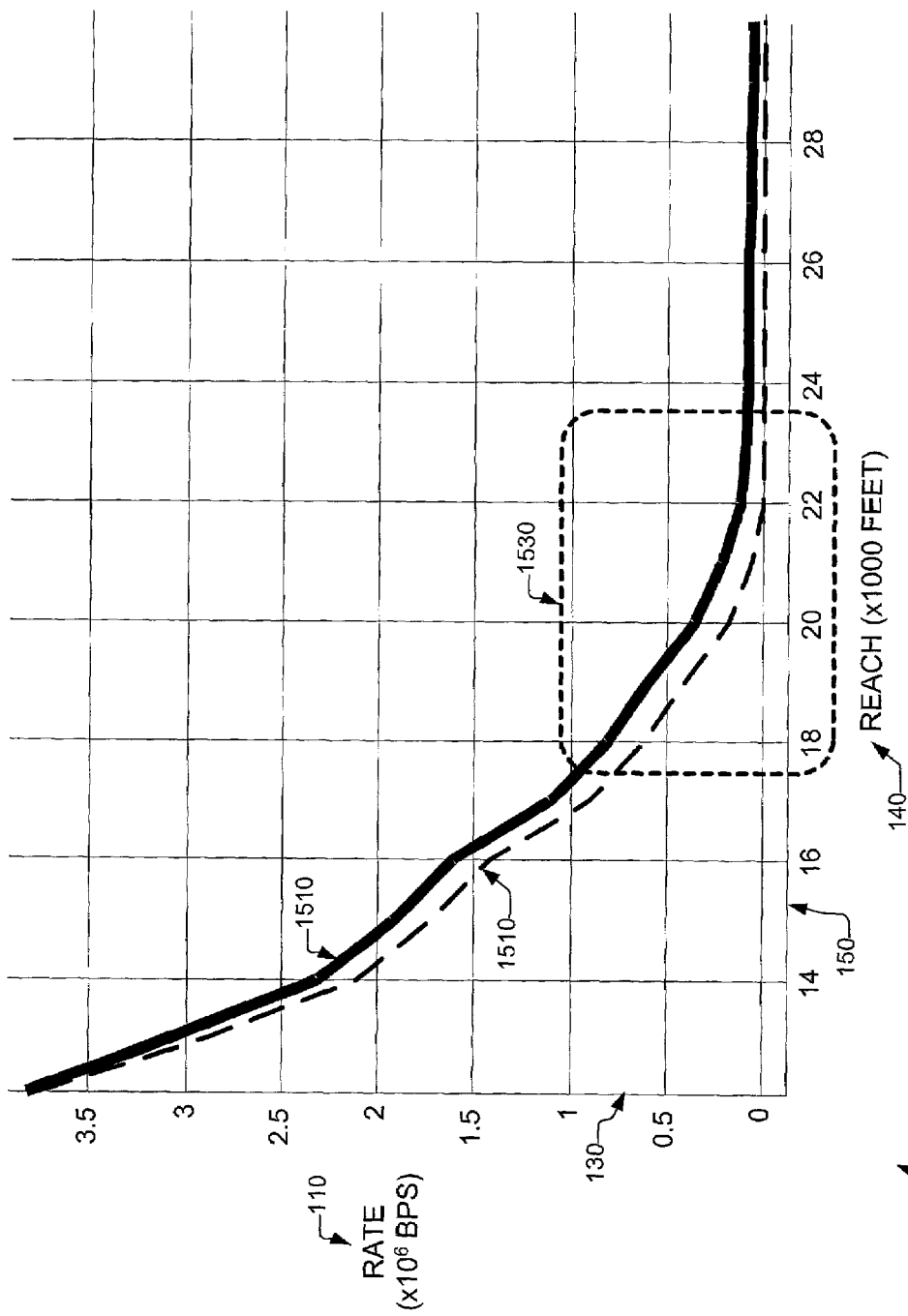

SYSTEM AND METHOD FOR INCREASING PAYLOAD CAPACITY BY CLUSTERING UNLOADED BINS IN A DATA TRANSMISSION SYSTEM

CROSS REFERENCE TO RELATED APPLICATIONS

This application claims the benefit of the following U.S. Provisional Patent Applications: U.S. Provisional Patent No. 60/289,995, dated May 10, 2001, and U.S. Provisional Patent titled "Clustering Modulation Synthesis," which was mailed on Oct. 19, 2001, Express Mail No. EL 891536478. These applications are entirely incorporated herein by reference.

FIELD OF INVENTION

This invention relates generally to communications systems, and more particularly to a system and method for increasing payload capacity by clustering unloaded bins in a data transmission system.

BACKGROUND

The SNR for a given system drops as a function of the reach or the distance between the transmit (or source) site and the receive (or sink) site. The practical consequence of this is that, if a specific bit error rate (BER) is desired, the reach of the system (i.e., the maximum reliable transmission distance between the source site and the sink site) becomes limited by the signal-to-noise ratio (SNR) of the bins used to carry the information (or data). Generally, in a digital subscriber line (DSL) system employing digital multi-tone (DMT) to transmit information, the system determines the SNR associated with each bin to determine whether each bin has sufficient capacity for data transmission. The SNR is derived as a function of the distance (or reach) and frequency, the desired BER, the type of data modulation, etc. Once the system determines which bins have sufficient SNR (hereinafter referred to as "sufficient-SNR bins") and which bins have insufficient SNR (hereinafter referred to as "insufficient-SNR bins"), the system usually allocates data to only those bins having a sufficient SNR to satisfy the BER requirement over a given distance. As a practical consequence of only loading sufficient-SNR bins with data, the insufficient-SNR bins are transmitted as "unloaded" bins (i.e., transmitted without data). Hence, generally, as the loop length (or reach) increases, the number of unloaded bins increases due to the SNR-per-bin limitation. In other words, for such a system, either the reach is limited by the bin SNR or the number of loaded bins is limited by the bin SNR. The SNR limitation causes inefficiencies in transmission of information from the source site to the sink site.

Due to these limitations, which exist in a DSL-DMT system as well as other types of signal transmission systems, there is a need in the art for a system and method of transferring data over a greater reach.

SUMMARY

The present invention provides a system and method for increasing payload in a data transmission system.

Briefly described, in architecture, one embodiment of the system includes a modulation device configured to modulate data bins to produce bin-clusters. Additionally, the system comprises a mechanism to load the bin-clusters with data, and a transmitter configured to transmit the loaded bin-clusters. The system further comprises a receiver configured to receive the transmitted bin-clusters, and a demodulation device configured to extract data from the received bin-clusters.

The present invention can also be viewed as providing methods for increasing payload in a data transmission system. In this regard, one embodiment of such a method can be broadly summarized by the following steps: modulating data bins to produce bin-clusters; loading the bin-clusters with data (i.e., the cluster payload); transmitting the loaded bin-clusters; receiving the transmitted bin-clusters; and extracting data from the received bin-clusters.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The above and further features, advantages, and benefits of the present invention will be apparent upon consideration of the following detailed description, taken in conjunction with the accompanying drawings, in which like reference characters refer to like parts throughout.

FIG. 15A is a graph showing a non-limiting example, wherein a corresponding increase in the reach is achieved from the rate improvement as shown in the non-limiting example of FIG. 14.

DETAILED DESCRIPTION OF DRAWINGS

Figure 1:
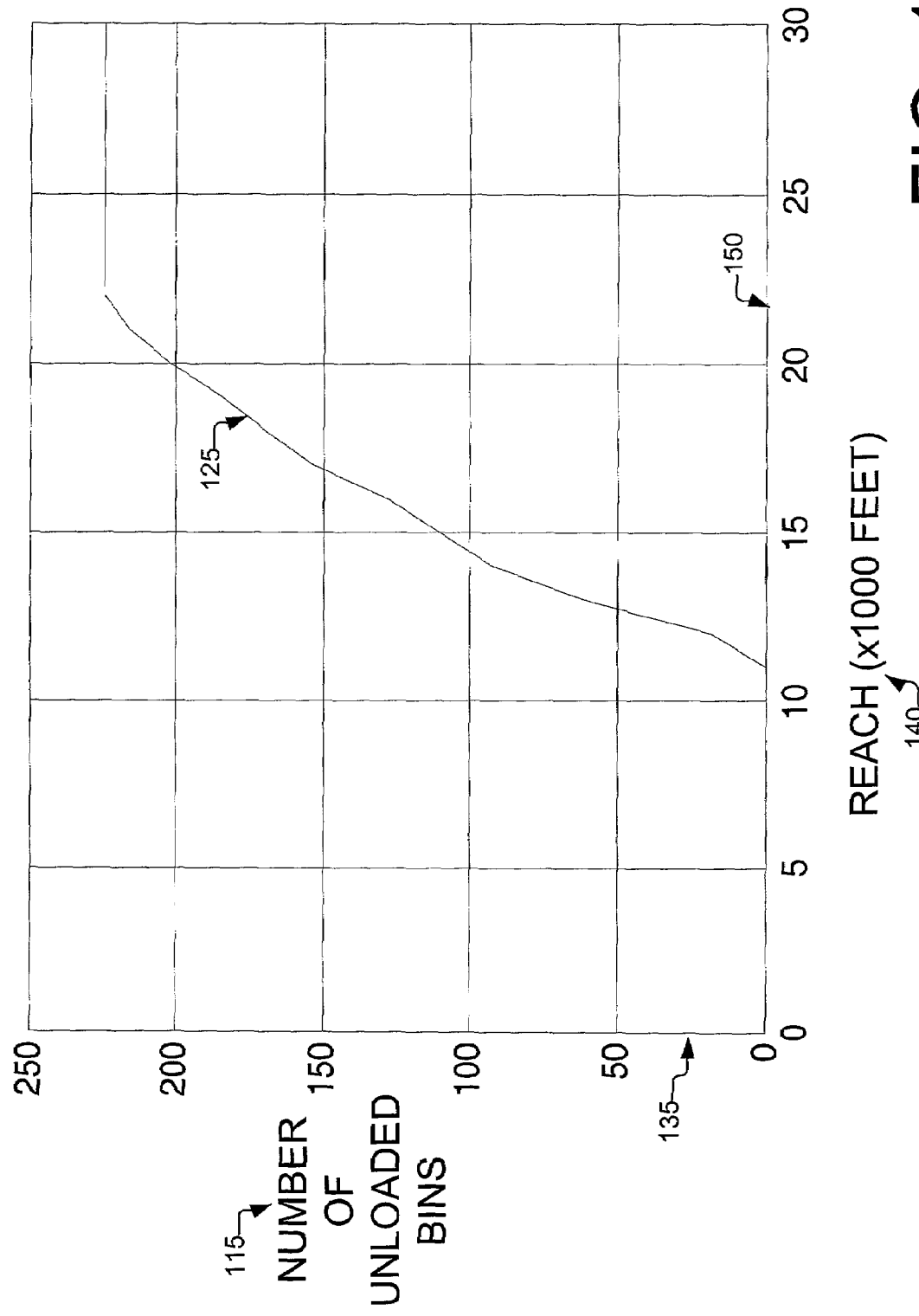
FIG. 1 is a graph showing the increasing number of unloaded bins that results with increasing distance (or reach) in a non-limiting embodiment of the invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

The significance of the signal-to-noise ratio (S/N) in a communication system arises because the noise corrupts the signal to a certain extent. Thus, if a given signal is transmitted from a source site to a sink site through a noisy channel, the signal that arrives at the sink site will contain the noise effects along with the transmitted signal. Additionally, if the noise is characterized as all-white Gaussian noise (AWGN) or random noise, then the received signal will be altered in a random way. As one can see, if the signal alteration is truly random, then the sink site will never know with absolute certainty whether the received signal is, in fact, the transmitted signal. Stated in statistical terms, the sink site can predict the transmitted signal to only within a certain confidence level. Furthermore, if the AWGN increases or, in the alternative, if the signal level decreases, then the confidence level at the sink site decreases, thereby resulting in a less "reliable" prediction of the transmitted signal by the sink site. Conversely, in order to maintain a certain confidence level of the predicted signal at the sink site, the S/N of the system must be sufficiently adequate.

Translating this to a data transmission system, the "reliability" of the system may be represented by a bit-error rate (BER), which essentially defines the desired confidence level at which the system should operate. Given this, if a system has a fixed noise floor, then that system would require a minimum signal level in order to achieve the desired BER. If the signal level is adequate to achieve the BER, then the system is said to have sufficient capacity for data transmission. On the other hand, if the signal level is inadequate to achieve the desired BER, then the system is said to have insufficient capacity for data transmission. As a practical consequence, when bins, which are loaded with data, are transmitted over a finite distance, these bins need to have sufficient S/N to properly carry the data from the source site to the sink site. Therefore, if the bins have varying S/N, then, at a certain distance or reach, only those bins having sufficient S/N should be loaded with data (since only those bins are able to achieve the desired BER). This is shown in FIG. 1, which is a graph showing the increasing number of unloaded bins that result with increasing distance (or reach) in a non-limiting embodiment of the invention. In this non-limiting example, which comprises 255 bins, the number of unloaded bins 115 is plotted on the y-axis 135 as a function of the reach 140, which is plotted on the x-axis 150. As shown here, at a distance of approximately 11,000 feet, every bin has a sufficient S/N to satisfy the desired BER. In other words, at a reach of 11,000 feet, every bin has a sufficient capacity to carry data from the source site to the sink site. As the distance increases from approximately 11,000 feet to approximately 22,000 feet, the number of unloaded bins increases because of the varying bin-S/N. In other words, since each bin has a different S/N, as the reach increases and, consequently, the signal decreases, the number of bins having sufficient S/N to satisfy the desired BER decreases until, at approximately 22,000 feet, every bin has insufficient capacity to satisfy the desired BER. Thus, if nothing is done to overcome the S/N deficiency arising from increasing reach, a system transmits data using bins having sufficient S/N (i.e., sufficient-capacity bins) and transmits the remaining insufficient S/N bins (i.e., insufficient-capacity bins) unloaded. This is shown in FIG. 2, which is a diagram showing a data transmission system having sufficient-capacity bins and insufficient-capacity bins due to SNR limitations shown in FIG. 1.

Figure 2:
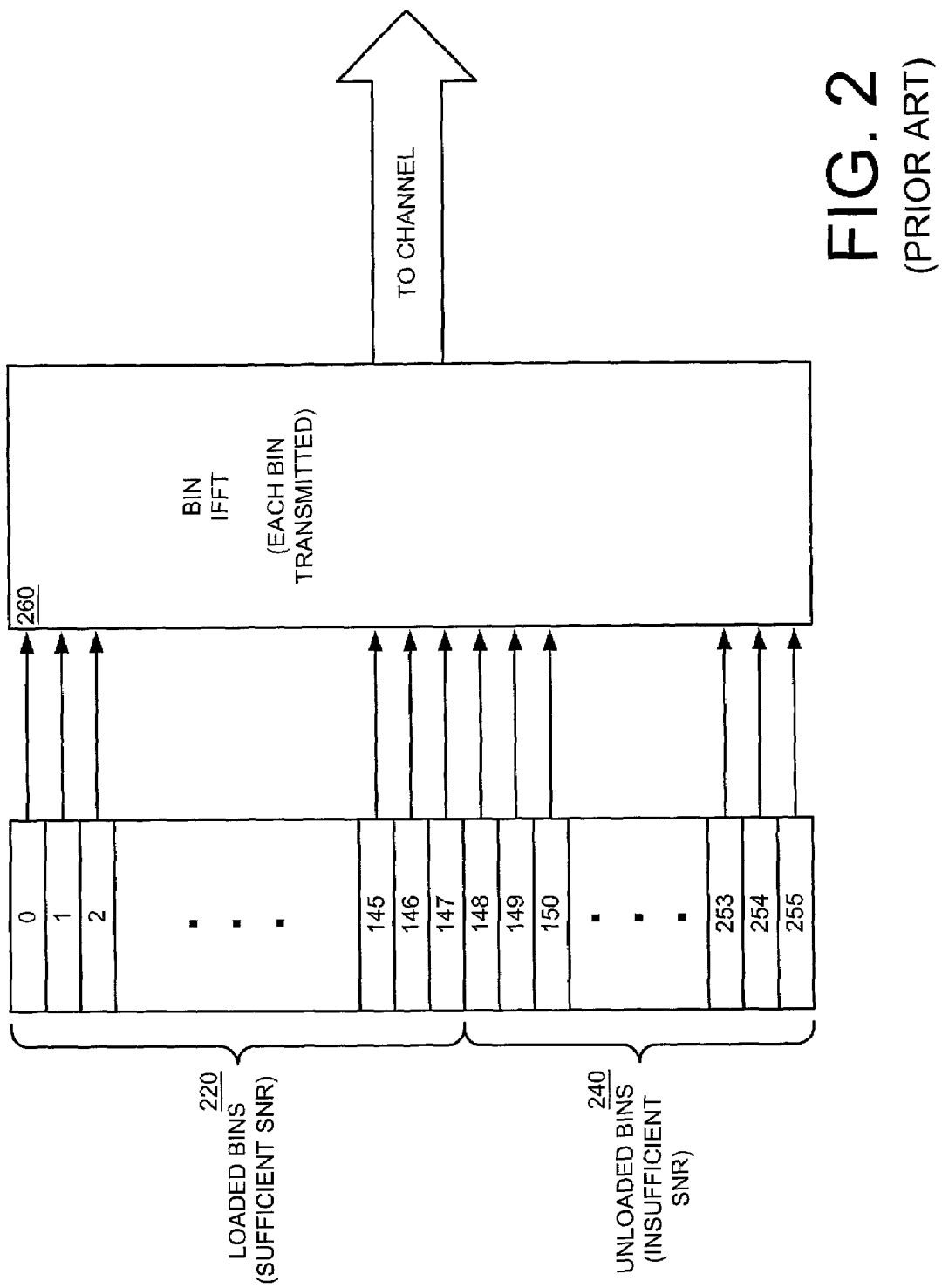
FIG. 2 is a diagram showing a data transmission system, as is known in the prior art, wherein some bins are transmitted without data (i.e., unloaded bins) due to SNR limitations.

As shown in FIG. 2, the first 148 bins (i.e., bins 0 through 147) are sufficient-capacity bins 220, which have a sufficient signal-to-noise ratio (SNR) to satisfy the desired BER. The remaining insufficient-capacity bins 240 (i.e., bins 148 through 255) have an insufficient SNR to satisfy the desired BER. Thus, in this example, these bins are transmitted as unloaded bins. It is worthwhile to note that the unloaded bins usually "follow" the loaded bins. In other words, there is generally, but not necessarily, a clear line of demarcation between the group of loaded bins, which "lead" or are at the beginning, and the group of unloaded bins, which "follow" or are at the end. Once the system loads the sufficient-capacity bins 220, both the loaded sufficient-capacity bins 220 and the unloaded insufficient-capacity bins 240 are sent to a bin inverse fast Fourier transform (IFFT), which transmits the loaded sufficient-capacity bins 220 and the unloaded insufficient-capacity bins 240 to a channel. While the preferred embodiment of FIG. 2 shows a Fourier-based system, it will be clear to one of ordinary skill in the art that systems employing other transmission basis may be amenable to the disclosed approach. Examples of these systems include, but are not limited to, wavelet transform-based systems, Hartley transform-based systems, Haar transform-based systems, Mallat transform-based systems, trigonometric-based transform systems, Walsh transform-based systems, Hadamard transform-based systems, Walsh-Hadamard transform-based systems, discrete cosine transform (DCT) based systems, non-trigonometric transforms, etc.

Figure 3:
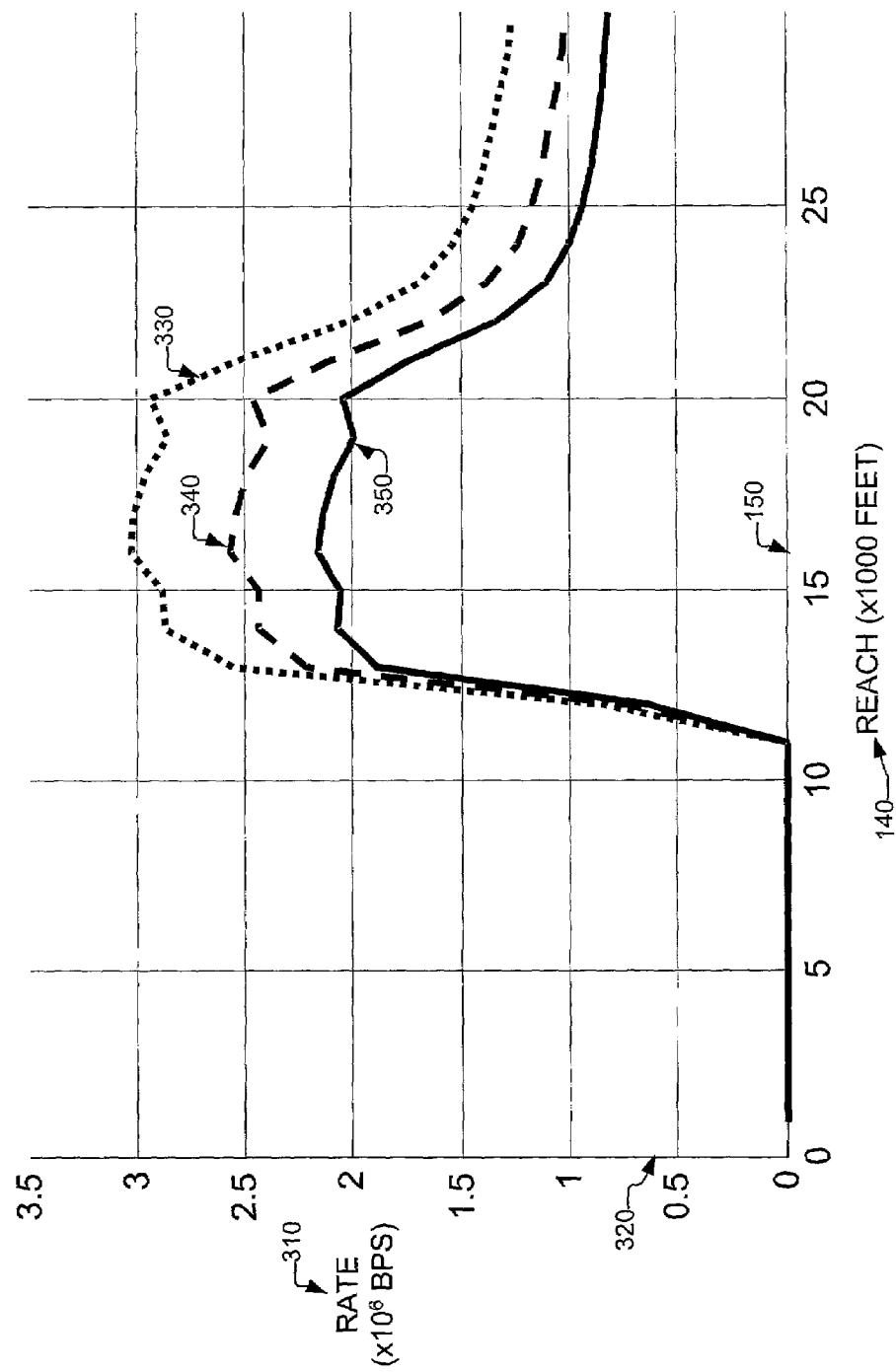
FIG. 3 is a graph showing rate improvement based on the available unloaded bandwidth that accompanies concomitant increases in channel coding gain in a non-limiting example depicting one embodiment of the invention.

As previously discussed, since noise can only be reduced to a finite degree, improvements in S/N are usually achieved by boosting the signal. This increase in signal, allows for a greater capacity because those bins that could not previously achieve the desired BER now have sufficient S/N to achieve the desired BER. FIG. 3 is a graph showing the rate improvement based on the use of the unloaded bandwidth. Here, the increases in bandwidth (or rate) that accompany concomitant increases in channel coding gain are plotted for a non-limiting embodiment of the invention. The rate 310 is plotted on the y-axis 320 as a function of the reach 140, which is plotted on the x-axis 150. This particular non-limiting example shows three plots 330, 340, 350 for a quadrature amplitude modulation (QAM) system having a desired BER of $10^{-7}$ and $-140$ dBm/Hz AWGN. As shown in FIG. 3, when the noise margin is compensated by the channel-coding gain (350 of FIG. 3), the rate does not exceed $2.2 \times 10^5$ bits/second (bps). However, as the channel coding gain exceeds the noise margin by 1 dB (340 of FIG. 3), the maximum rate increases to approximately $2.6 \times 10^5$ bps, and, if the channel coding gain further exceeds the noise margin (i.e., by 2 dB, 350 of FIG. 3), the maximum rate reaches approximately $3 \times 10^5$ bps. Thus, in a very general sense, if a system has a fixed noise floor (e.g., $-140$ dBm/Hz in the particular non-limiting example of FIG. 3) and a desired BER (e.g., $10^{-7}$ in the particular non-limiting example of FIG. 3), then the rate 310 increases with increasing gain.

As shown earlier, the SNR for each bin in a signal transmission system may be slightly different from the other bins, thereby resulting in the transmission of unloaded bins if those bins are insufficient to satisfy the desired BER. Given this, if a sufficient-capacity bin in a QAM-4 system is designated as having a minimum SNR of $\eta_{QAM\ 4}$, then those bins having a SNR greater than $\eta_{QAM\ 4}$ would be designated as sufficient-capacity bins while those bins having a SNR not greater than $\eta_{QAM\ 4}$ would be designated as insufficient-capacity bins. Thus, if R[q,t] represents a complex received signal on bin q at symbol t, then R[q,t] having a SNR greater than $\eta_{QAM\ 4}$ may be received without alteration since R[q,t] would have sufficient capacity to satisfy the desired BER. On the other hand, the remaining R[q,t] would have to be altered in some way to "boost" the SNR so that the desired BER may be met. The "boost" in SNR is achieved through a clustering modulation (or cluster-modulation) technique as described below in a non-limiting example environment.

Figure 4:
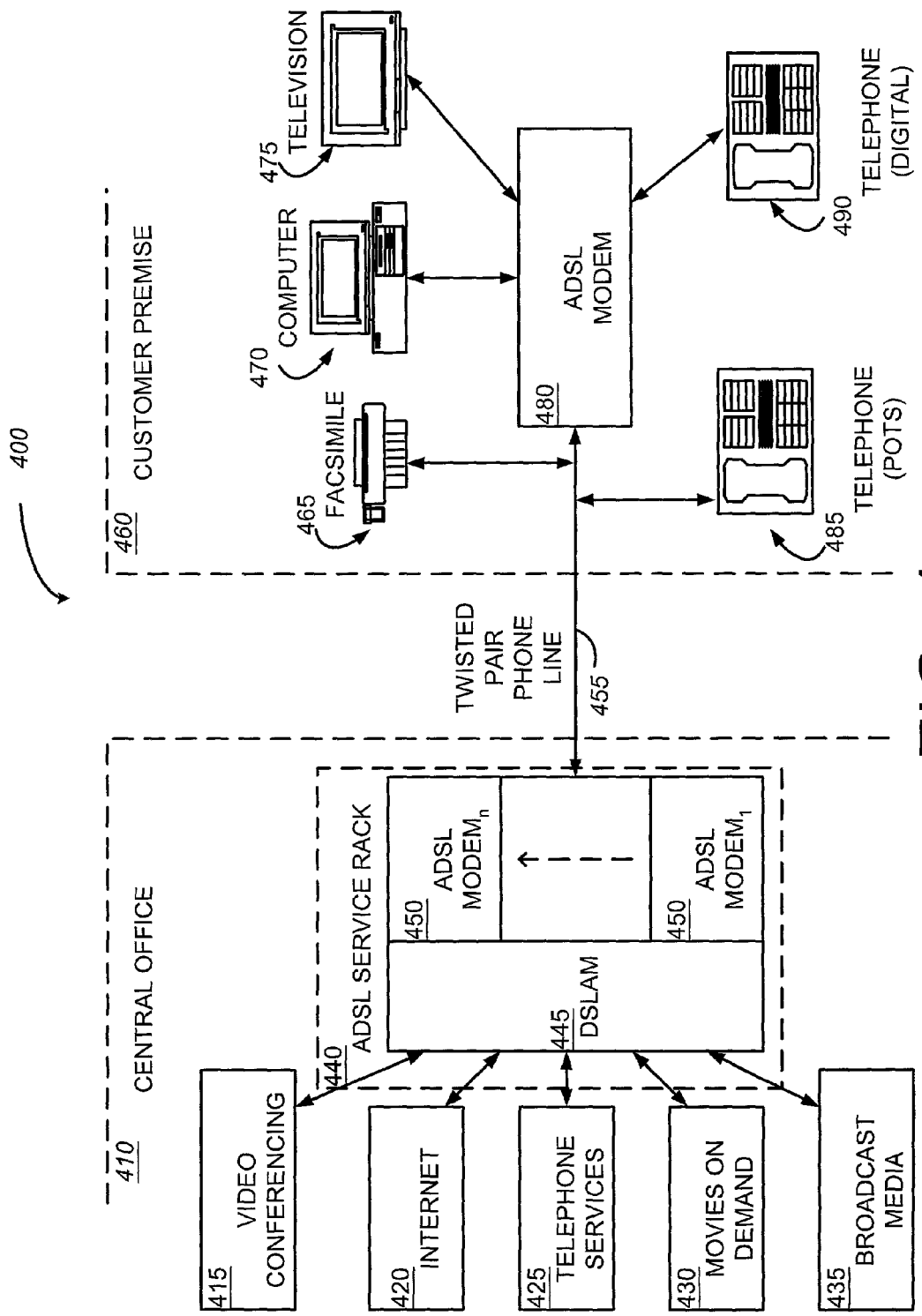
FIG. 4 is a diagram showing a non-limiting example environment that contains one embodiment of the system of the invention.

FIG. 4 is a diagram showing a non-limiting example environment that contains one embodiment of the system of the invention. Generally, the ADSL system is implemented between a central office 410 and a customer premise 460. Communication between the two sites 410, 460 takes place over a two-wire pair phone line 455 (also referred to as a local loop, twisted pair line, or channel). The central office 410 end of the twisted pair phone line 455 is configured to provide broadband services (e.g., video conferencing 415, Internet 420, telephone services 425, movies on demand 430, broadcast media 435, etc.), which are assembled via central office ADSL modems 450 for transmission over the twisted pair phone line 455. The central office 410 assembles the signals from the broadband services at an ADSL service rack 440, which comprises a digital subscriber line access multiplexer (DSLAM) 445 and ADSL modems 450. The central office 410 assembles the broadband services via the DSLAM 445 for appropriate transformation and transmission by one or more ADSL modems 450. Each of the ADSL modems 450 may be in communication via a dedicated twisted-pair telephone line 455 with a suitably configured ADSL modem 480 at a customer premise 460.

As illustrated in FIG. 4, the DSLAM 445 and each of a plurality of ADSL modems 450 may be assembled within an ADSL service rack 440 within the central office 410. For simplicity of illustration and explanation, the ADSL communication system 400 presented in FIG. 4 is shown with a single ADSL service rack 440 for communicating each of the broadband services to n ADSL modems 450. The ADSL service rack 440 may be configured to supply conditioned resources necessary to support the operation of the n ADSL modems 450. Those skilled in the art will appreciate the scalability of the ADSL communication system 400 generally presented in FIG. 4. For example, the central office 410 may be configured with a plurality of Transmission Control Protocol/Internet Protocol (TCP/IP) routers and Asynchronous Transfer Mode (ATM) switches (not shown) that may distribute one or more broadband service signals to a plurality of DSLAMs 445. In turn, the plurality of DSLAMs 445 may further distribute the broadband service signals to a plurality of remotely located ADSL modems 480.

At the opposite end of the twisted-pair telephone line 455, the customer premise 460 may be configured with a compatible ADSL modem 480, which may be configured to process and distribute the multiple broadband services to appropriate destination devices such as a computer 470, a television 475, and digital telephones 490 as illustrated. It is significant to note that that the customer premise 460 may have POTS devices such as a facsimile machine 465 and an analog (POTS) telephone 485 integrated on the twisted-pair telephone line 455 along with the ADSL modem 480. It is also feasible that the customer premise 460 may be replaced in some applications by another central office 410 or an ADSL repeater, where the POTS service may not be available or needed.

Figure 5:
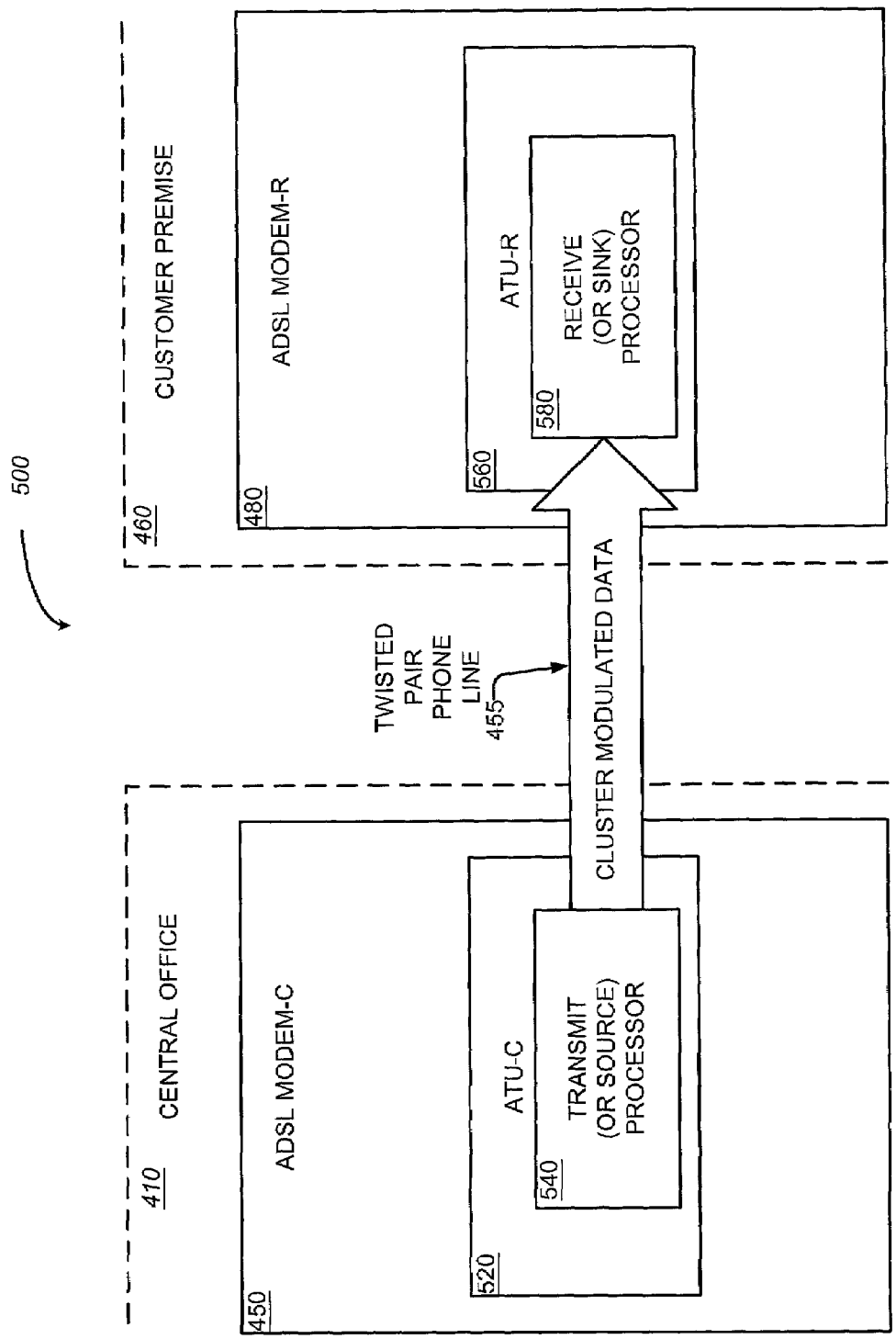
FIG. 5 is a diagram showing a non-limiting example of the data transmission components of FIG. 4 in one embodiment of the invention in greater detail.

FIG. 5 is a diagram showing a non-limiting example of the data transmission components of FIG. 4 in one embodiment of the invention in greater detail. As shown here, ADSL modem 450 at the central office 410 comprises an ADSL transceiver unit (ATU) 520 having a transmit processor 540. Also, the ADSL modem 480 at the sink site 460 comprises an ATU 560 having a receive processor. While the components of the source processor 540 and the sink processor 580 will become clearer from FIGS. 6A through 7B, it is worthwhile to generally discuss the operation of the cluster modulation technique in order to shed light on the system components associated with the preferred embodiment of the invention. Also, while details of the cluster modulation technique are described with reference to FIGS. 8 through 13, a general overview of the technique is described below to provide a context for the system components of FIGS. 6A through 7B.

As discussed earlier, the data bins are separated into sufficient-capacity and insufficient-capacity bins depending on each bin's SNR, and only those bins having sufficient SNR are loaded with data for data transmission. If it is assumed that there are $N_U$ insufficient-capacity bins that have a SNR not greater than $\eta_{QAM\ 4}$, and each insufficient-capacity bin that belongs to cluster c is indexed by $q_i^c$, wherein $1 \leq i \leq N_c$, $1 \leq c \leq M$, $N_c$ is the number of bins that belong to cluster "c" and M is the total number of clusters, then the following relationship holds:

$$\sum_{c=1}^{M} \sum_{i=1}^{N_c} q_i^c = N_U$$

Hence, a finite number of bins may be clustered together into bin-clusters having a SNR not less than $\eta_{QAM\ 4}$, thereby allowing signal transmission using the sufficient-capacity bin-clusters. One approach to determining the size $N_c$ of each bin cluster c is based on the definition of a cluster c, which is defined as a group of bins loaded with the same complex number $A^c$ or, more generally, loaded with an array of known fixed phase-shifted versions of a single complex number $A^c$. From a general standpoint, $A^c$ is called the cluster payload. Moreover, the group of bins within a cluster should lead, at the receiver side (after propagation through the physical layer & Fourier Transform), to a maximum likelihood estimate of the cluster payload $A^c$ that exhibits a minimum signal to noise ratio $SNR_{min}^{dB}$ value, which depends upon the modulation used and the required bit error rate (BER). For a DMT based on QAM modulation the minimum SNR equals $\eta_{QAM\ 4}$.

The clustering criterion is therefore the cluster payload maximum likelihood estimate of the SNR, hereinafter referred to as the maximum-likelihood signal-to-noise ratio (ML-SNR). Since the ML-SNR is the summation of the linear SNRs of each bin after FEQ (see Eqs. 3 through 14 below), the clustering criterion consists of cumulatively adding the adjacent linear SNRs after classical FEQ at the source site until the desired SNR $\eta_{QAM\ 4}$ is reached, and repeating this process until all $N_U$ insufficient-capacity bins have been clustered into M sufficient-capacity bin-clusters. If $N_U$ is known before the clustering process as an output of the classical bit-loading algorithm, then the output of the clustering process produces the number of clusters M. Since, in a standard DSL-DMT system, the SNR for each bin is already calculated in order to determine whether the bins should be loaded or unloaded, the sink site 460 has a priori knowledge of each bin's SNR. In other words, each bin's capacity (i.e., sufficient or insufficient) is a priori known at the sink site. This procedure may be repeated until all of the insufficient-capacity bins have been assigned (or designated) to a bin-cluster $q_i^c$, wherein $1 \leq c \leq M$ and $1 \leq i \leq N_c$. The specific grouping of bins are referred to as a cluster pattern. Hence, the clustering of the insufficient-capacity bins usually results in multiple bin-clusters c defined by a specific cluster pattern. This cluster pattern, once determined by the sink site using the a priori known SNR of each bin from the sink site, may be used by the source site to cluster the individual insufficient-capacity data bins. These clustered data bins are then used for signal transmission. This process is shown in greater detail with reference to FIGS. 8 through 11, below.

At the sink site, each received bin-cluster $R^c[t]$ (for $1 \leq c \leq M$) would be separated into their component bins $R[q_i^c,t]$ (for $1 \leq i \leq N_c$), which comprise the bin-clusters. These separated bins would be phase compensated if a fixed phase diversity has been introduced at the source side (see Eq. 15 below) and will always undergo cluster FEQ (i.e., will be multiplied by a complex coefficient that reflects the cluster payload estimation error based on the use of all the bins that belong to the same cluster according to Eqs. 15 and 19 below). Once the bins have been phase compensated (if needed) and have undergone cluster FEQ, they are linearly summed to produce the soft maximum likelihood estimate of the cluster payload that is part of the cluster payload estimation error according to Eq. 9 (see below). While this process is shown in greater detail with reference to FIGS. 12 and 13, it is worthwhile to note that the complex weights are not limited to unit-modulus or unit-amplitude weights, but, rather, may be non-unit-amplitude weights. In other words, the absolute amplitude of the complex weights may be greater than or less than one.

FIGS. 6A through 7B show non-limiting example systems that are configured to execute the cluster modulation technique generally described above.

Figure 6A:
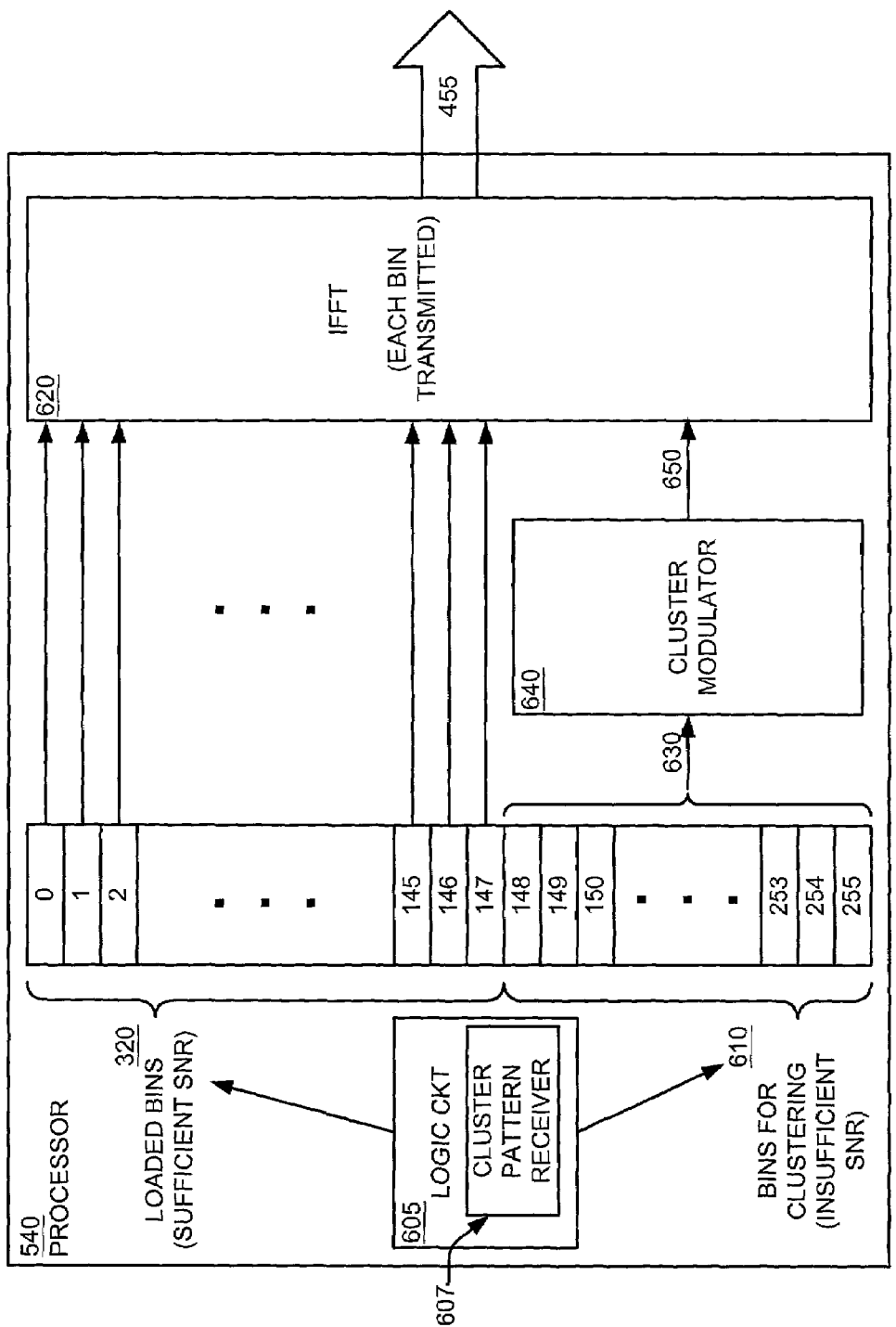
FIG. 6A is a diagram showing a non-limiting example of the transmit (or source) processor of FIG. 5 in one embodiment of the invention in greater detail.

FIG. 6A is a diagram showing a non-limiting example of the transmit (or source) processor of FIG. 5 in one embodiment of the invention in greater detail. As shown in FIG. 6A, the source processor 540 comprises a logic circuit 605 having a cluster pattern receiver 607. The cluster pattern is determined at the sink site and will be discussed further with reference to FIG. 7A. However, it is worthwhile to note that, here, at the source site, the cluster pattern receiver 607 receives the cluster pattern so that the insufficient-capacity bins 610 may be clustered according to the received cluster pattern. In addition to the logic circuit 605 having the cluster pattern receiver 607, the source processor 540 comprises a cluster modulator 640 configured to cluster the insufficient-capacity bins 610 into bin-clusters having sufficient capacity for data transmission. The additional components of the source processor 540 are similar to those of a prior art system, and comprise the data bins 320, 610 and the bin IFFT 620 configured to transmit the loaded bins from the source site.

Figure 6B:
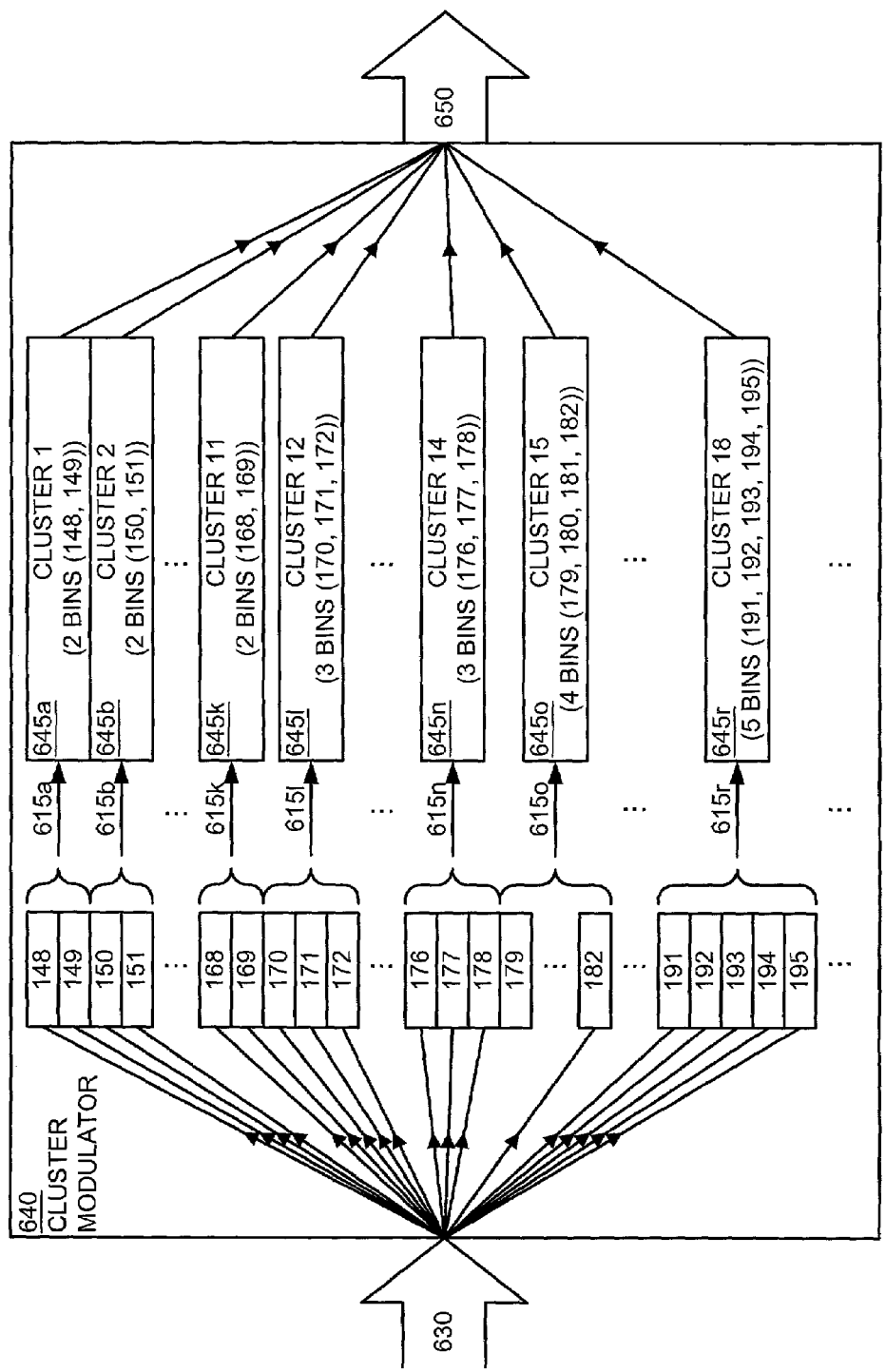
FIG. 6B is a diagram showing a non-limiting example of the cluster modulator of FIG. 6A in one embodiment of the invention in greater detail.

FIG. 6B is a diagram showing a non-limiting example of the cluster modulator 640 of FIG. 6A in one embodiment of the invention in greater detail. Once the cluster pattern has been received by the cluster pattern receiver 607 in the source processor, the cluster modulator clusters the previously-unloaded insufficient-capacity bins 610 into bin-clusters (collectively referred to using the reference numeral 645). These bin-clusters 645 are an indexed grouping of the insufficient-capacity bins 610 according to the received cluster pattern. One the cluster modulator 640 clusters the insufficient-capacity bins 610 into bin-clusters 645, each bin of each respective bin-cluster 645 is loaded with the same information for data transmission. For example, bins 148 and 149 in FIG. 6B would be loaded with the same data since those bins are associated with the same bin-cluster (bin-cluster 1) 645a. Bins 150 and 151 would be loaded with the same cluster payload since those bins are associated with the same bin-cluster (i.e., bin-cluster 2) 645b. Thus, all the bins comprising the bin-clusters 645 would be loaded in similar fashion until all bins were loaded with data. As one can see, by loading the previously-unloaded insufficient-capacity bins with data, the system now has a greater capacity for data transmission.

Figure 6C:
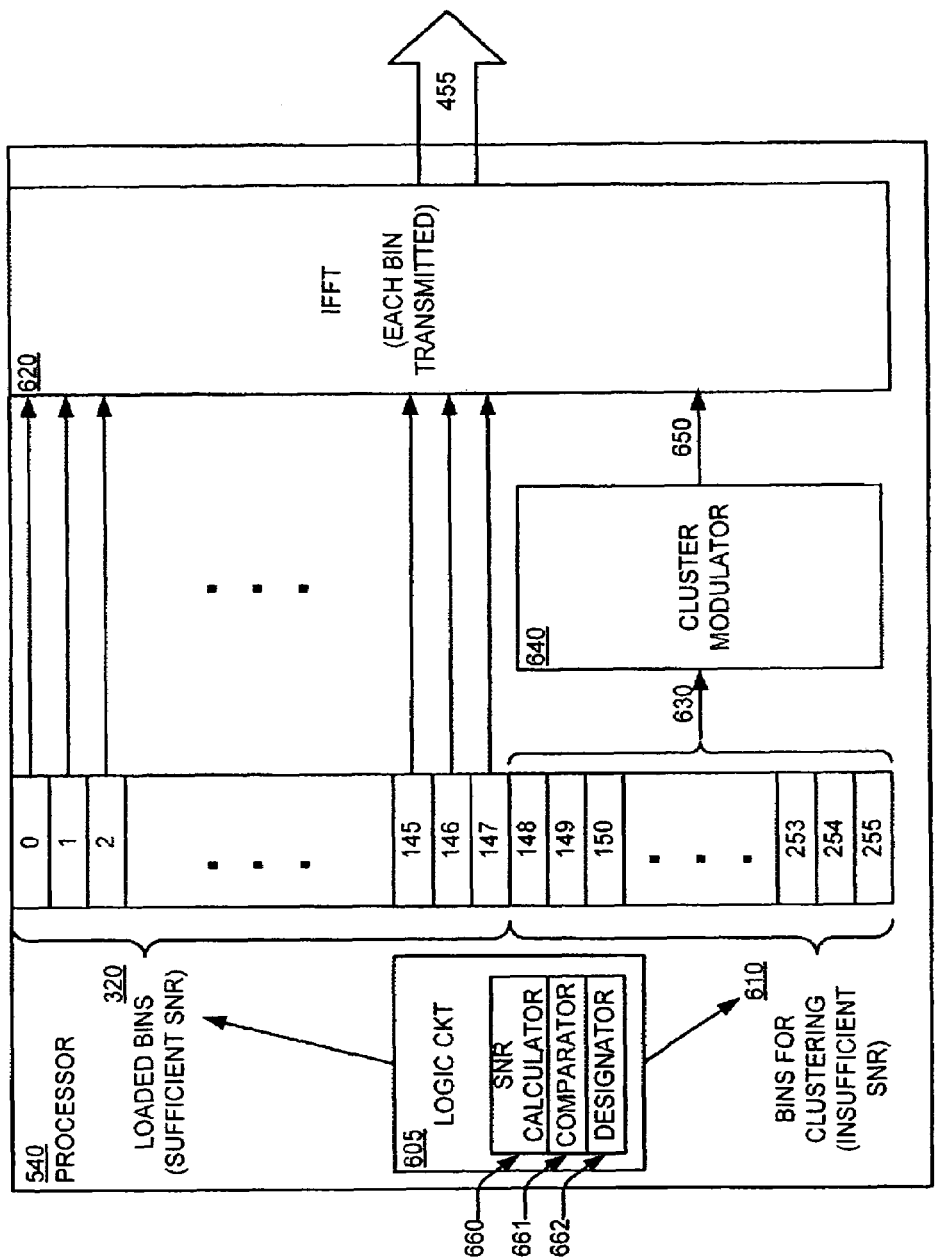
FIG. 6C is a diagram showing a non-limiting example of the transmit (or source) processor of FIG. 5 in one embodiment of the invention in greater detail.

FIG. 6C is a diagram showing an alternative non-limiting example of the transmit (or source) processor. FIG. 6C depicts a modulation device with a corresponding SNR calculator 660, a comparator 661, and a designator 662. A circuit which can be to configured sequentially add insufficient-capacity bins until the linear sum of the individual bins exceeds the predefined threshold SNR is also shown. These components of an exemplary embodiment will be described in further detail below in reference to FIGS. 7A–7C.

Figure 7A:
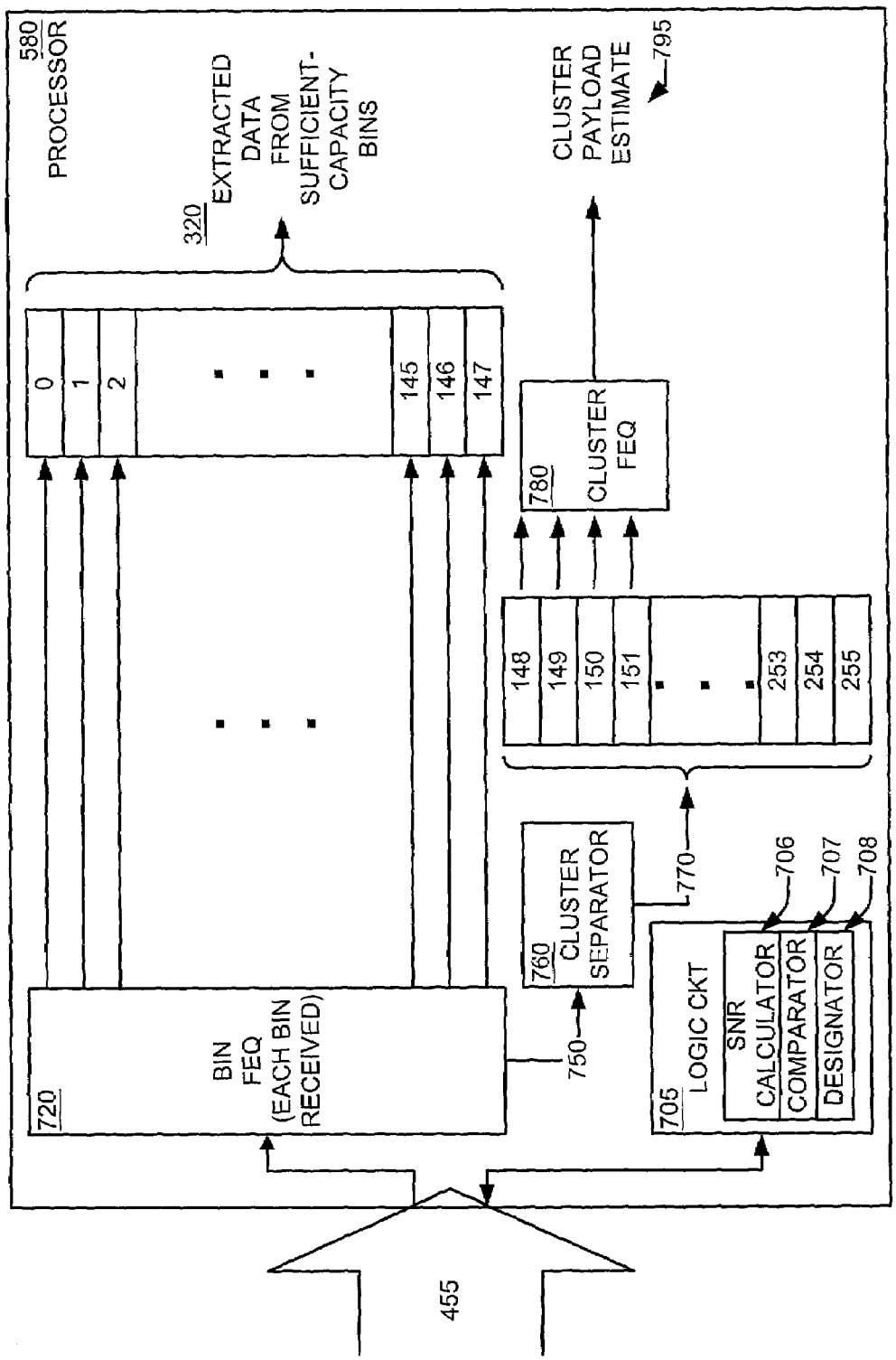
FIG. 7A is a diagram showing a non-limiting example of the receive (or sink) processor of FIG. 5 in one embodiment of the invention in greater detail.
Figure 7B:
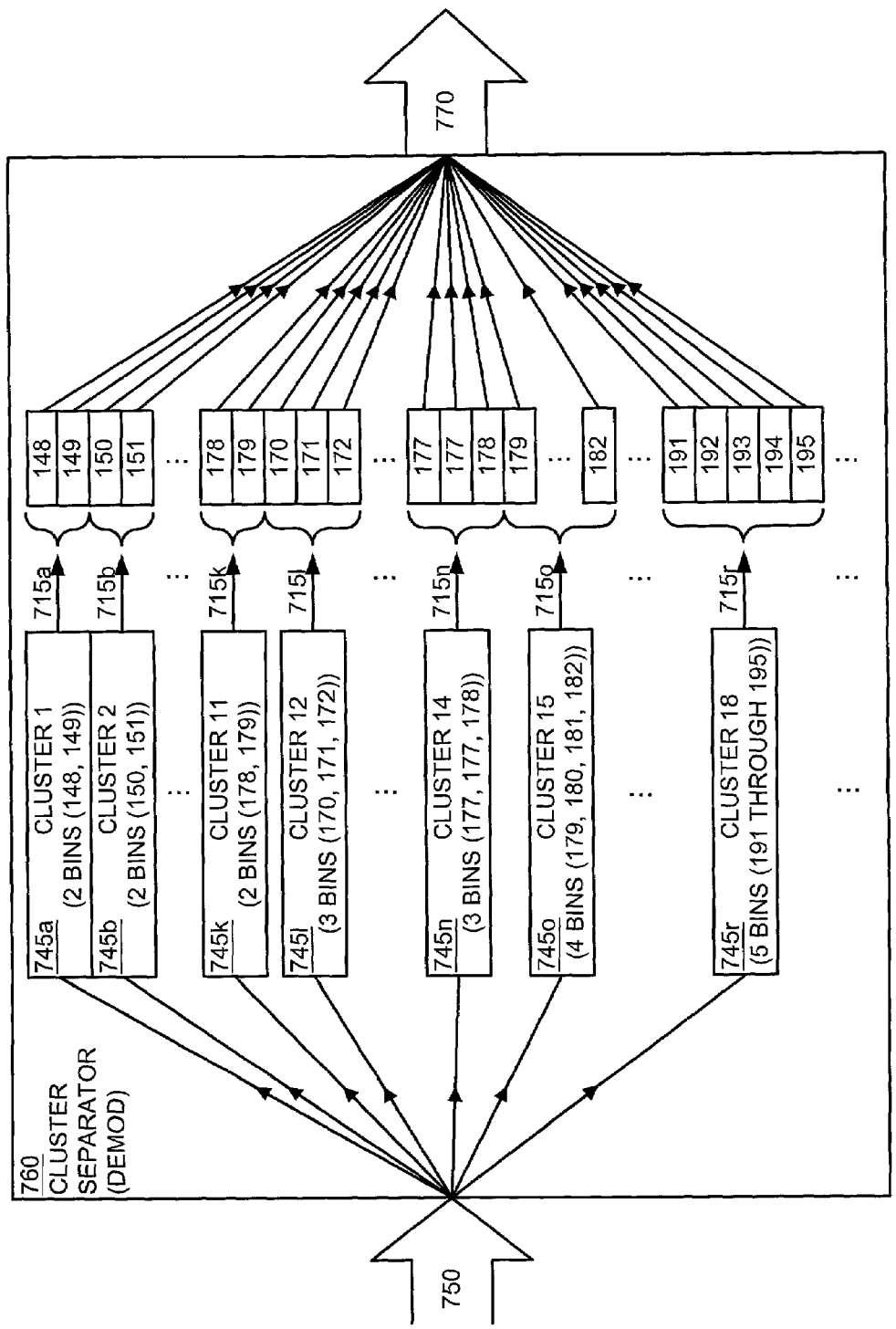
FIG. 7B is a diagram showing a non-limiting example of the cluster separator (demodulator) of FIG. 7A in one embodiment of the invention in greater detail.

FIG. 7A is a diagram showing a non-limiting example of the receive (or sink) processor of FIG. 5 in one embodiment of the invention in greater detail. As alluded to earlier, the sink processor 580 comprises a logic circuit 705, which is configured to determine the cluster pattern for clustering the insufficient-capacity data bins at the source site. The logic circuit 705 is configured to include a signal-to-noise ratio (SNR) calculator 706, which calculates the SNR associated with each bin. The logic circuit 705 further comprises a comparator 706 configured to compare the calculated SNR of each bin to a predefined threshold value that is indicative of whether or not that bin has sufficient capacity for data transmission. The logic circuit 705 further comprises a bin-designator 708, which is configured to designate those bins having SNR greater than the pre-defined threshold as sufficient-capacity bins for normal data transmission and those bins having SNR not greater than the pre-defined threshold as insufficient-capacity bins for clustering before data transmission. This information is determined at the initial "handshake" between the source site and the sink site, thereby allowing the sink site to determine a cluster pattern and transmit that cluster pattern to the source site. In addition to the logic circuit 705 configured to determine the capacity of each bin, the sink processor 580 comprises a bin FEQ 720, which is configured to receive the loaded sufficient-capacity bins as well as the loaded bins for each cluster 645 (FIG. 6B). The sink processor further comprises a cluster separator 760 (or demodulator) that separates (or demodulates) the clustered bins according to the cluster pattern that was determined during the handshake between the source site and the sink site. Once these bins have been demodulated by the cluster separator 760, the system now has both sufficient-capacity bins 320, which have been transmitted normally, and demodulated bins 710, which also contain data. A phase compensation (if needed) is performed, and then the cluster FEQ 780 is applied (i.e., a complex weight is applied to each of the demodulated bins 710 in order to minimize the payload estimation error shared by all the bins that belong to the same cluster according to Eqs. 15 and 19 below). It is worthwhile to note that the complex weights used in the cluster FEQ need not be of unit amplitude, but, rather, may be greater than or less than one. Once the bins have been phase compensated (if needed) and have undergone cluster FEQ, they are linearly summed to produce the soft maximum likelihood estimate of the cluster payload that is part of the cluster payload estimation error according to Eq. 9 (see below). FIG. 7B is a diagram showing a non-limiting example of the cluster separator 760 of FIG. 7A in one embodiment of the invention in greater detail. The cluster separator 760 here is similar to the cluster modulator 640 of FIG. 6B in that it is configured to identify which bins are associated with which bin-clusters 745. In other words, the cluster separator 760 determines, according to the cluster pattern determined during the initial handshake, the clustering of the bins according to their respective bin-clusters 745.

Figure 7C:
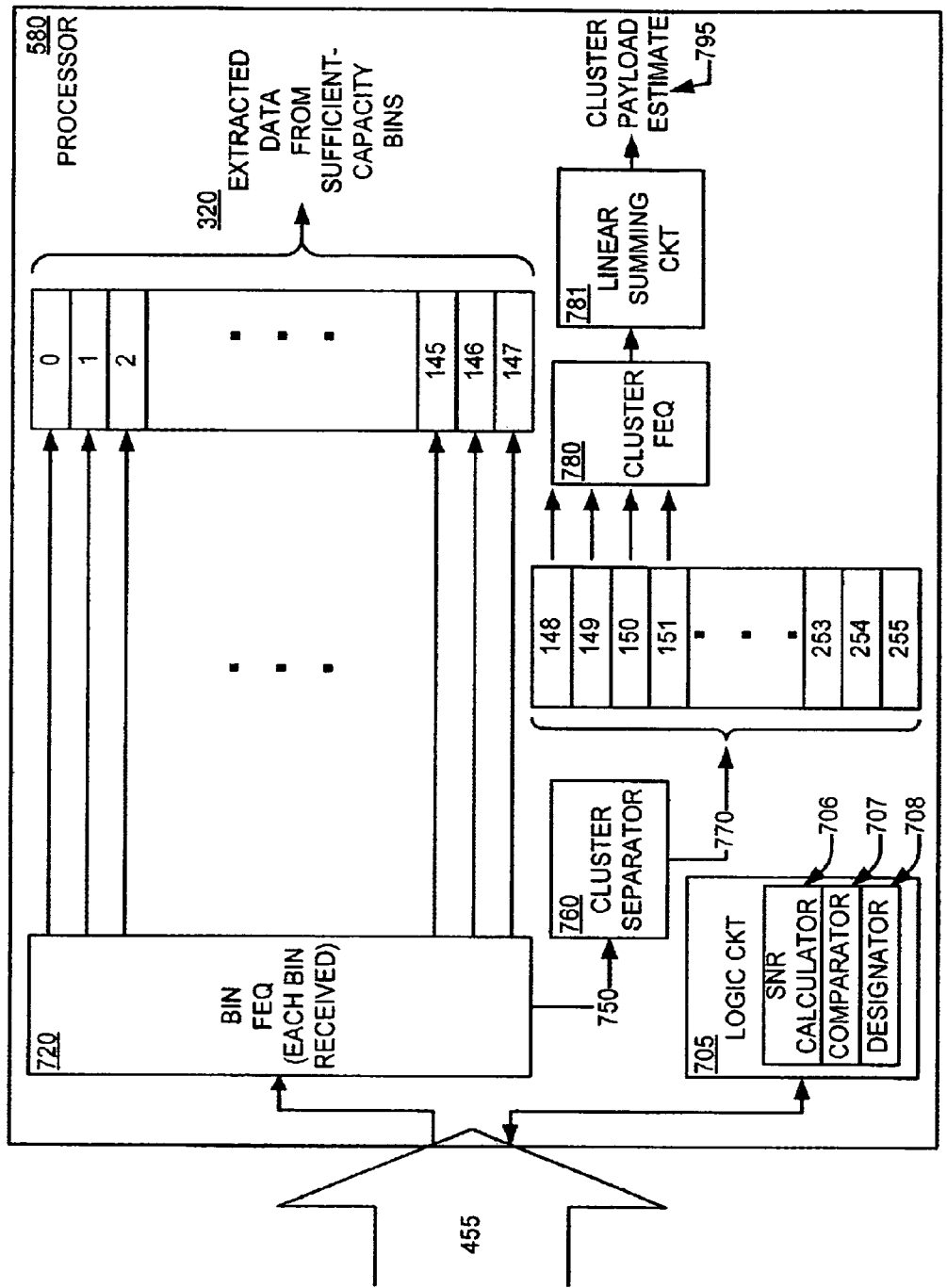
FIG. 7C is a diagram showing a non-limiting example of the receive (or sink) processor of FIG. 5 in one embodiment of the invention in greater detail.

FIG. 7C is a diagram showing an alternative non-limiting example of the receive (or sink) processor. FIG. 7C depicts a linear summing circuit 781, which can be configured to produce the data stored within received insufficient capacity bins.

Having described the system components associated with one embodiment of the invention, reference is made to FIGS. 8 through 13, which show one embodiment of the method associated with the system of FIGS. 6A through 7B.

Figure 8:
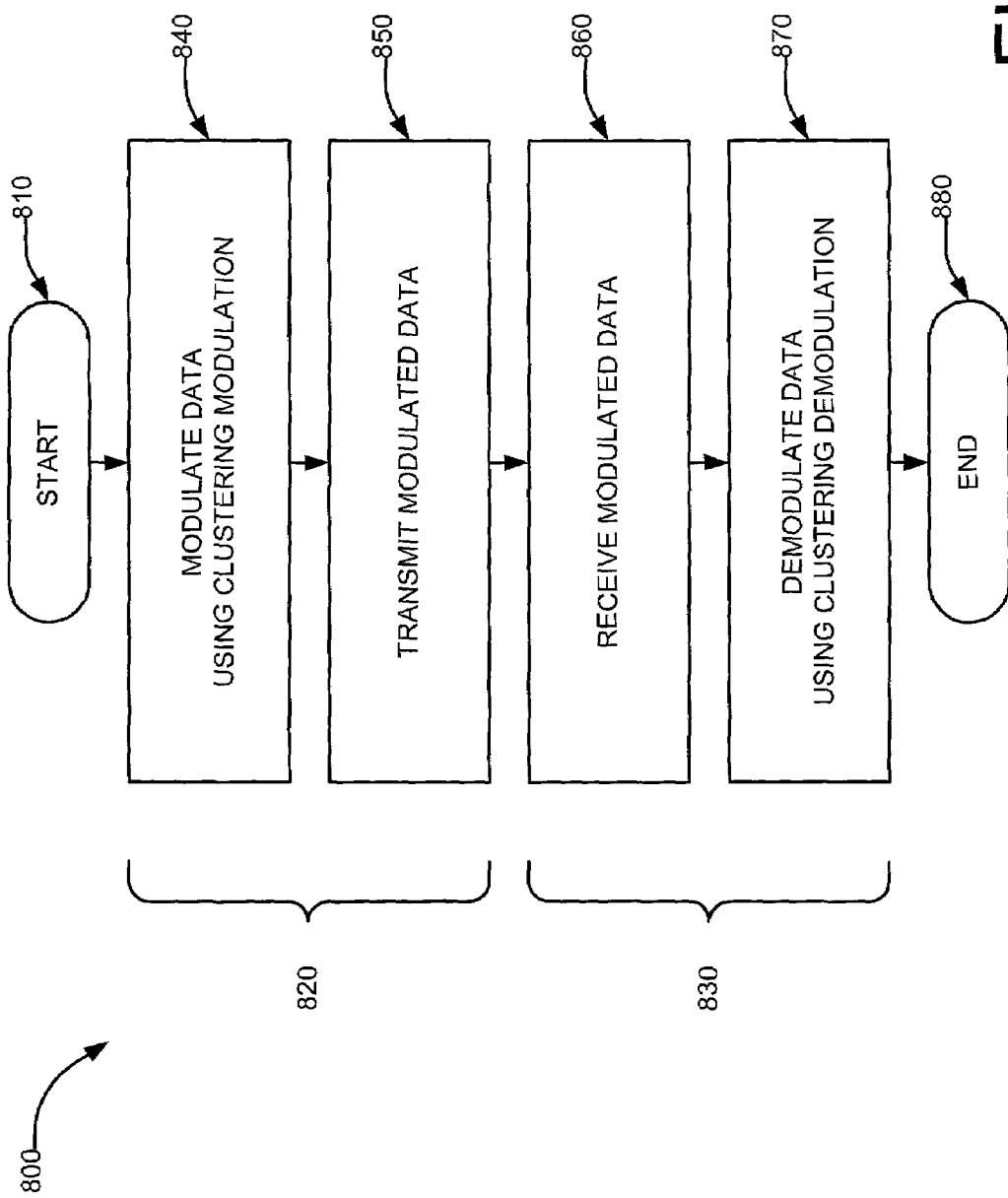
FIG. 8 is a flow chart showing a non-limiting example of the method steps associated with one embodiment of the invention.

FIG. 8 is a flow chart showing a non-limiting example of the method steps associated with one embodiment of the invention. In a broad sense, the method comprises the steps associated with clustering 820, and the steps associated with extracting 830 data from the clusters. The clustering 820 steps comprise the steps of modulating 840 the data using a cluster modulation technique, which involves the grouping of insufficient-capacity bins according to a maximum-likelihood estimate that is a function of the bin-SNR. This modulation technique will be described in greater detail with reference to FIGS. 9 through 11. In addition to the modulating step 840, the clustering step also comprises the step of transmitting 850 the cluster-modulated data once the data has been modulated 840 according to the maximum-likelihood estimate. The data extraction steps 830 comprise the steps of receiving 860 the cluster-modulated data, and demodulating 870 the data using a cluster-demodulation technique. Similar to the modulating step 840, the demodulation steps 870 rely on maximum-likelihood estimate information. As will be shown later, in a preferred embodiment, this information is known a priori at the sink site so that no additional calculations are necessary in the demodulating step 870 once they have been determined for the modulation steps 840.

Figure 9:
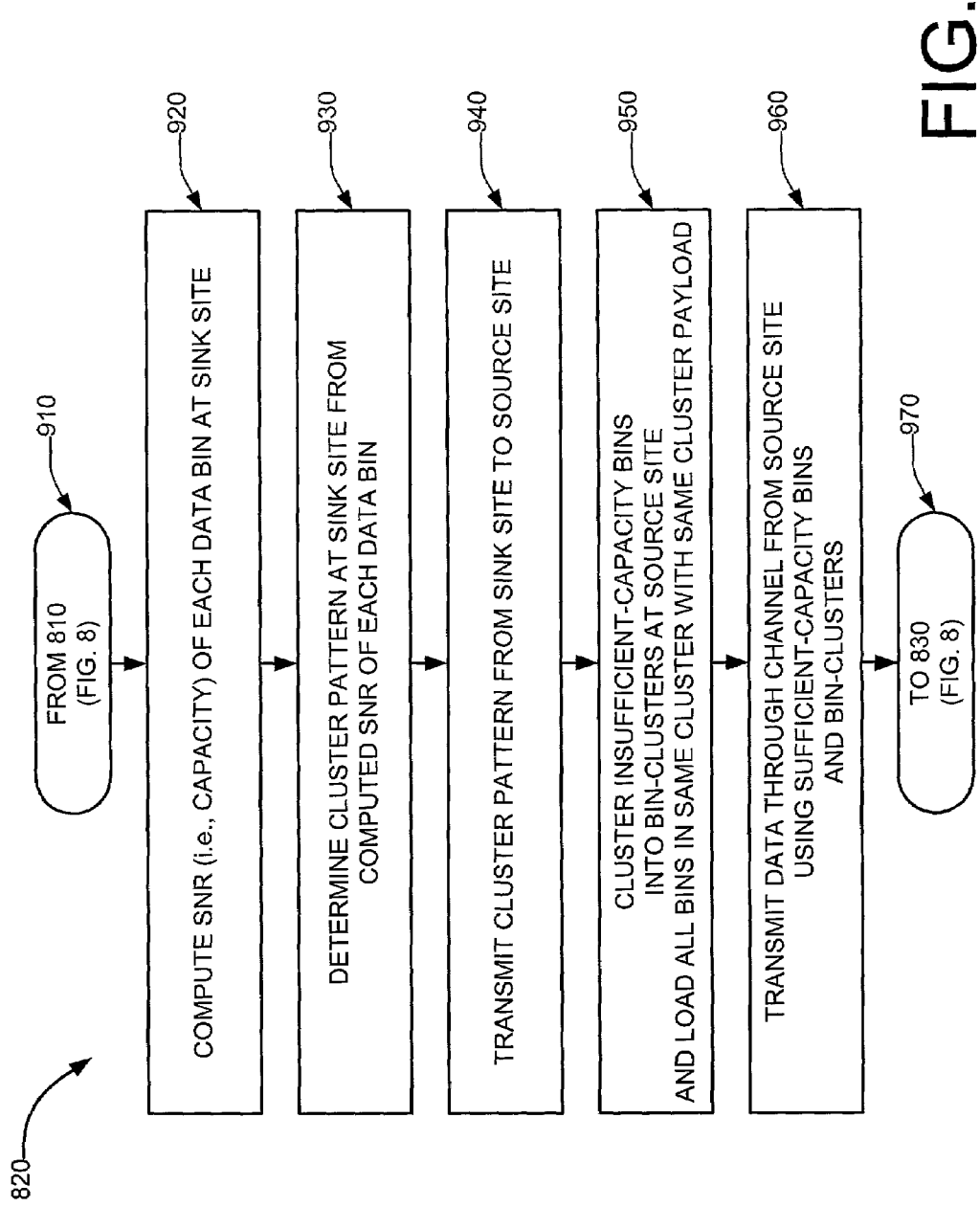
FIG. 9 is a flow chart showing a non-limiting example of the transmitting step and cluster-modulating step of FIG. 8 in greater detail.

FIG. 9 is a flow chart showing a non-limiting example of the cluster-modulating step 840 and transmitting step 850 of FIG. 8 in greater detail. In order to apply the cluster-modulation technique, the system computes, in step 920, the linear SNR of each data bin at the sink site after FEQ, using a SNR calculator 705 (FIG. 7A). Upon calculating the SNR of each data bin, a cluster pattern is determined, in step 930, by a logic circuit 705 (FIG. 7A) at the sink site. This cluster pattern is then transmitted, in step 940, from the sink site to the source site. The source site then selectively clusters, in step 950, the bins into bin-clusters according to the cluster pattern determined in step 940. Data is then loaded into the clusters and transmitted, in step 960, using the bin-clusters as well as those bins that have sufficient capacity for data transmission.

Figure 10A:
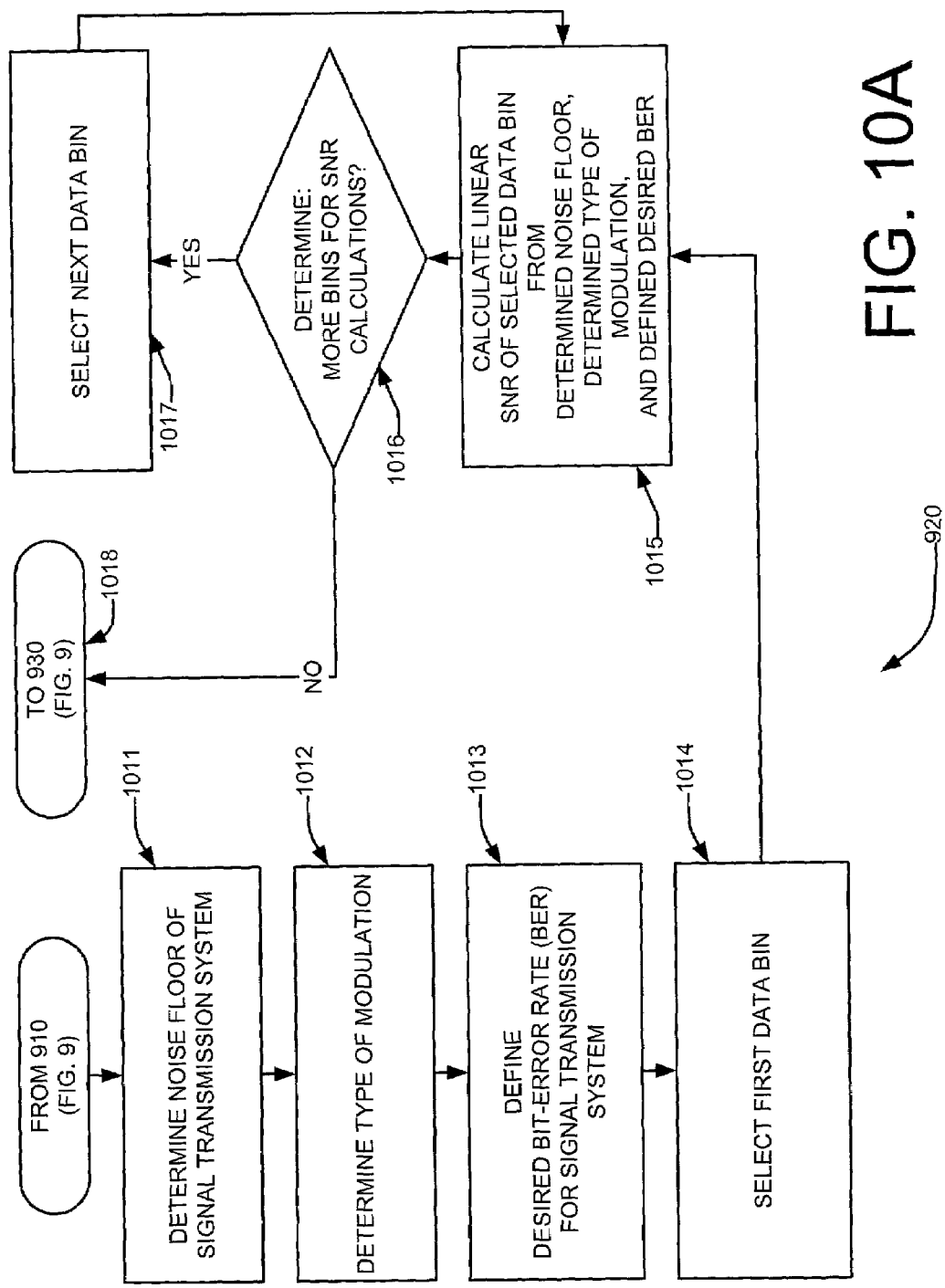
FIG. 10A is a flow chart showing a non-limiting example of the steps involved in the step of computing the capacity of each bin in FIG. 9.

FIG. 10A is a flow chart showing a non-limiting example of the steps involved in the step of computing the capacity of each bin in FIG. 9. In order to determine the SNR of each data bin, the system determines, in step 1011, a noise floor associated with the signal transmission system. In other words, in step 1011, the system determines the noise level of the data path. In addition to the noise floor, the system determines, in step 1012, the type of data modulation (e.g., QAM4, etc.). Furthermore, a desired bit-error rate (BER) for signal transmission is defined in step 1013. Once these variables have been determined, the system selects, in step 1014, the first bin for SNR calculation, and calculates the linear SNR of the selected bin from the determined 1011 noise floor, the determined 1012 type of modulation, and the defined 1013 desired BER. This provides an indication of the capacity of the system since the capacity $C_{QAM}$ is defined as:

$$C_{QAM} = \Delta f \sum_k \left( \log_2\left(1 + \frac{SNR_k^{FEQ}}{\Gamma}\right) \right), \quad [\text{Eq. 1}]$$

where $\Delta f$ is the frequency bandwidth of bin k, $SNR_k^{FEQ}$ is the linear SNR of bin k at the output of the FEQ, and $\Gamma$ is the SNR gap in dB as defined by:

$$10 \log_{10}(\Gamma) = 9.8 - (\gamma_{coding\_gain} - \gamma_{noise\_margin}) \quad [\text{Eq. 2}].$$

Having calculated, in step 1015, the linear SNR of the selected 1014 bin, the system determines, in step 1016, whether there are additional bins remaining for SNR calculation. If the system determines 1016 that there are more bins for SNR calculation, the system selects, in step 1017, the next bin and repeats the process from step 1015. If, on the other hand, the system determines, in step 1016, that the SNR has been calculated for all bins, then the system proceeds to the cluster determination step 930 of FIG. 9.

Figure 10B:
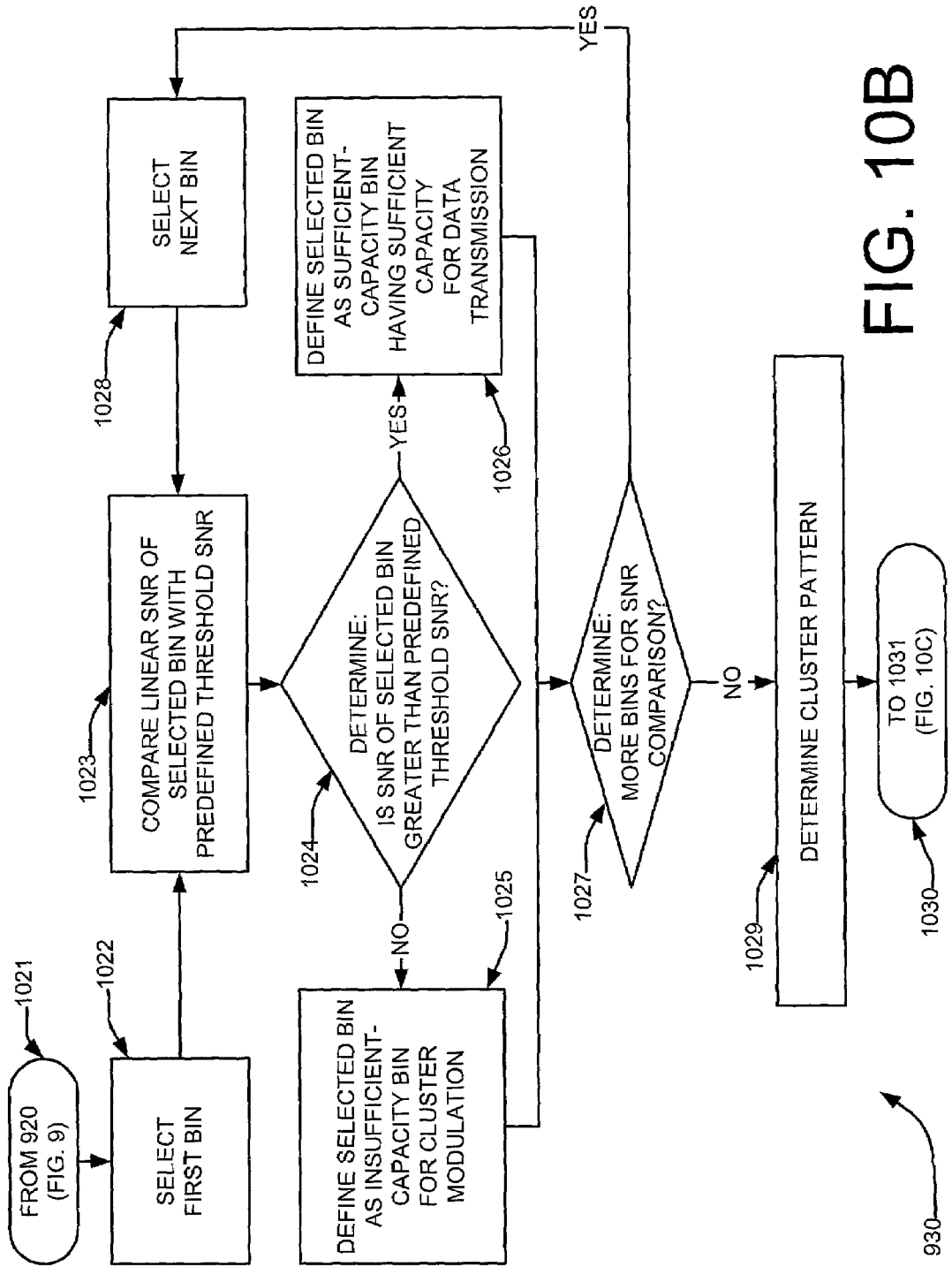
FIG. 10B is a flow chart showing a non-limiting example of the steps involved in the step of determining sufficient-capacity bins and insufficient-capacity bins in FIG. 9.

FIG. 10B is a flow chart showing a non-limiting example of the steps involved in the step of determining the cluster pattern (i.e., determining sufficient-capacity bins and insufficient-capacity bins) 930 in FIG. 9. Having determined each bin's SNR in step 920, the system selects, in step 1022, the first bin and compares, in step 1023, the selected bin's SNR with a predefined threshold SNR. In a QAM4 system with a desired BER of $10^{-7}$ and a noise floor of $-140$ dBm/Hz white noise, the threshold SNR is typically 14.5 dB. Thus, in such a system, the system compares 1023 whether the calculated SNR of the selected bin is greater than 14.5 dB. If the system, in step 1024, determines that the SNR of the selected bin is greater than the predefined threshold SNR (e.g., greater than 14.5 dB), then the system, in step 1026, defines the selected bin as a sufficient-capacity bin having a sufficient capacity for data transmission in that system. If, on the other hand, the system determines 1024 that the SNR of the selected bin is not greater than the predefined threshold (e.g., less than or equal to 14.5 dB), then the system defines, in step 1025, the selected bin as an insufficient-capacity bin, which should be clustered with other insufficient-capacity bins using the cluster-modulation technique. Once the selected bin has been defined as either a sufficient-capacity bin or an insufficient-capacity bin, the system, in step 1027, determines whether or not there are additional bins for designation (or definition) as sufficient-capacity or insufficient-capacity bins. If the system determines 1027 that there are additional bins, then the system, in step 1028, selects the next bin and repeats the process from step 1023. If, on the other hand, all bins have been designated as either sufficient-capacity or insufficient-capacity bins, then the system proceeds to step 1029, wherein the cluster pattern is determined. This is shown in greater detail with reference to FIG. 11.

Figure 10C:
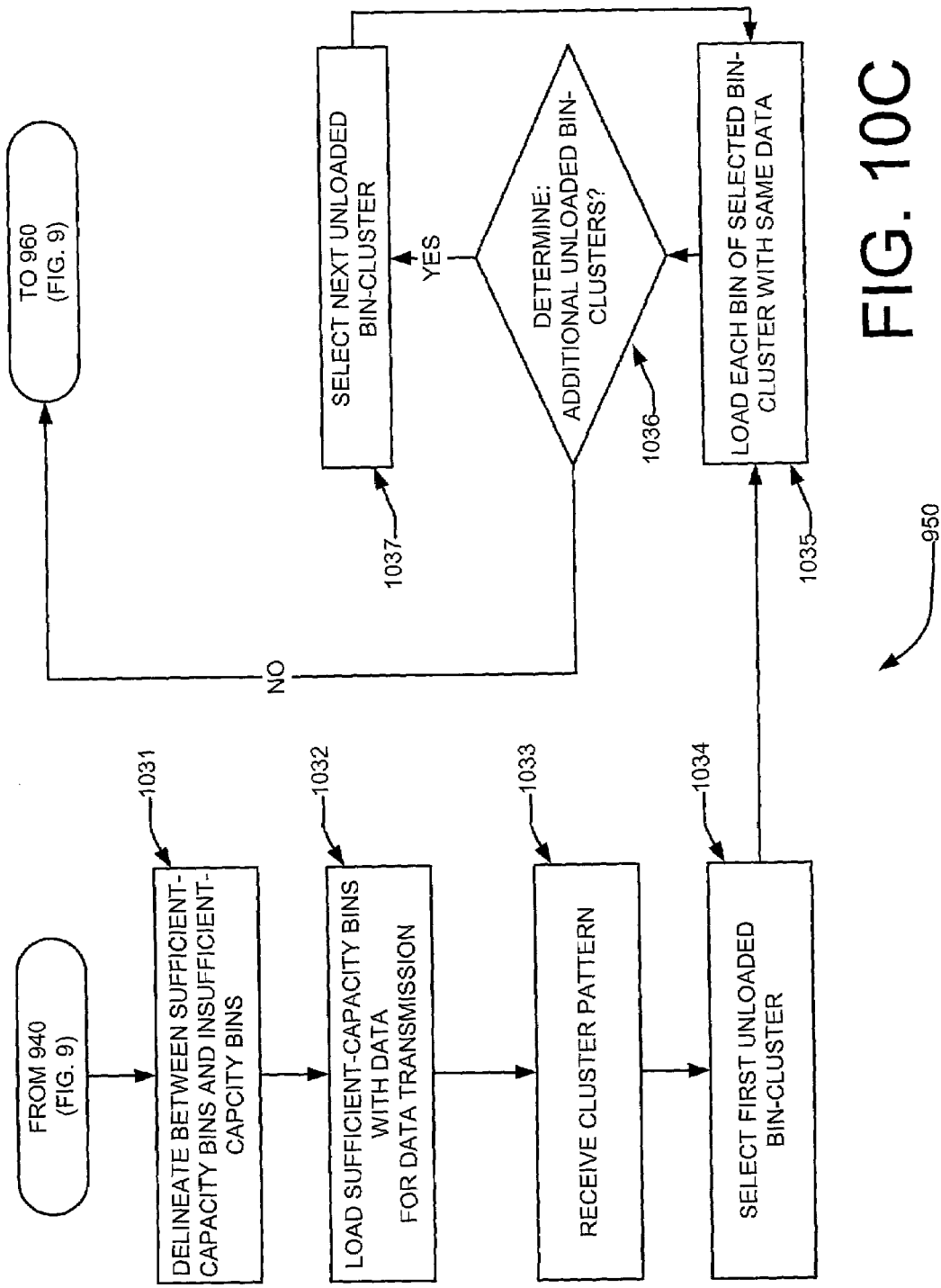
FIG. 10C is a flow chart showing a non-limiting example of the steps involved in the step of clustering the insufficient-capacity bins into sufficient-capacity bin-clusters in FIG. 9.
Figure 11:
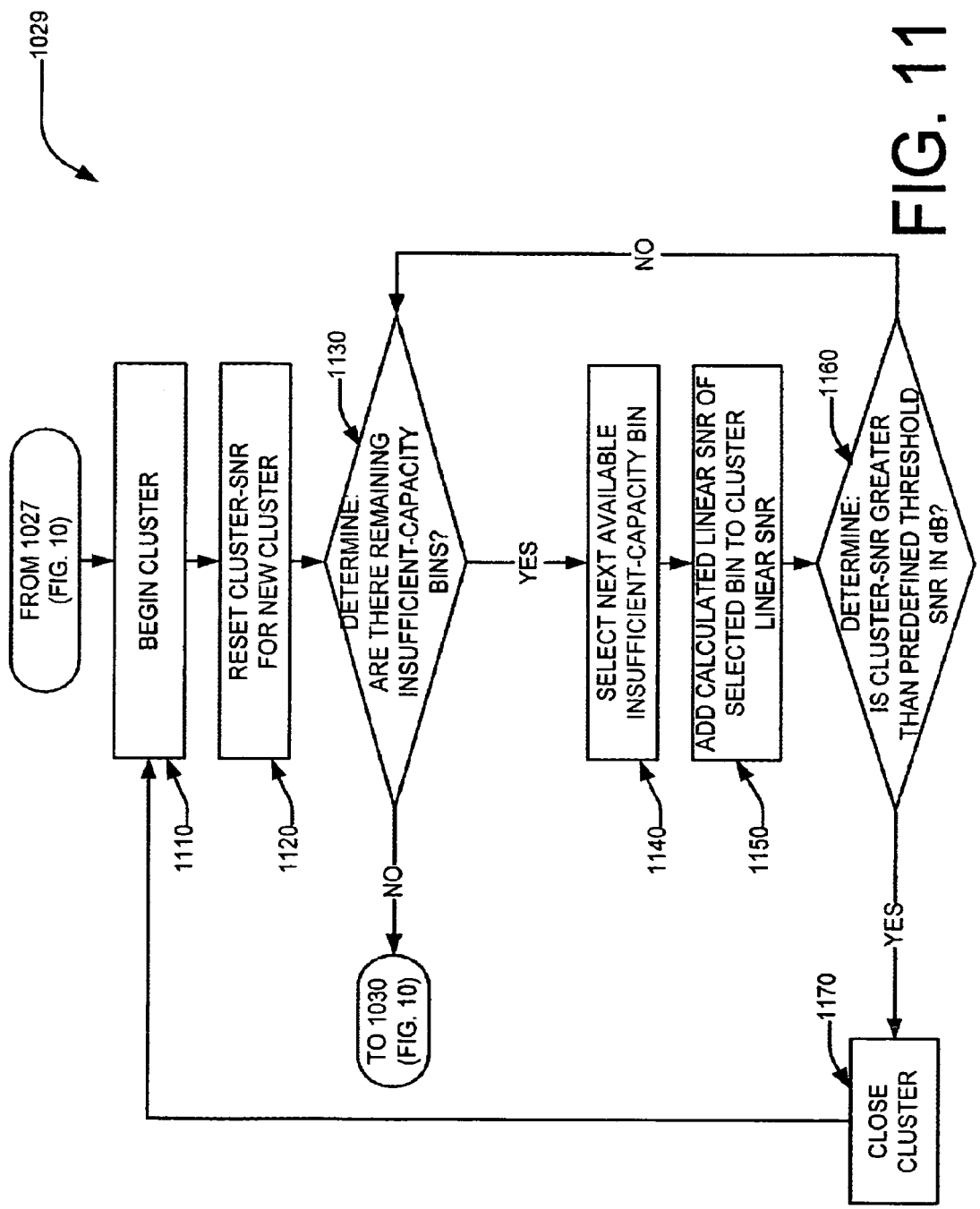
FIG. 11 is a flow chart showing a non-limiting example of the step of the determination of the cluster pattern in FIG. 10C in greater detail.

FIG. 11 is a flow chart showing a non-limiting example showing the determination 1029 of the cluster pattern in FIG. 10C in greater detail. Once all of the bins have been designated as either a sufficient-capacity bin or an insufficient-capacity bin, the system proceeds to cluster the insufficient-capacity bins into bin-clusters, thereby determining the cluster pattern. The system, in step 1110, begins a cluster, which, at this time, is empty. The SNR of the cluster is, in step 1120, reset. Once this is done, the system is now ready to cluster the insufficient-capacity bins into bin-clusters. Thus, in step 1130, the system determines whether there are any insufficient-capacity bins for clustering. If, in step 1130, the system determines that there exist insufficient-capacity bins, then the system, in step 1140, selects the first available insufficient-capacity bin and marks that bin as belonging to the bin-cluster. The SNR of that bin is then added, in step 1150, to the SNR of the selected bin-cluster. Since the maximum likelihood estimate of the cluster payload exhibits a linear SNR, $SNR_{ML}^{c,linear}$, that is equal to the summation of the linear SNR of all the bins, $SNR_{FEQ}^{linear}$, according to:

$$SNR_{ML}^{c,linear} = \sum_{i=1}^{N_c} (SNR_{FEQ}^{linear}[q_i^c]),$$ [Eq. 3]

wherein $q_i^c$ designates all the bins that belong to cluster c, $N_c$ is the total number of insufficient-capacity bins, and $1 \leq i \leq N_c$, the cluster becomes simply a linear combination of previously unloaded bits. This is because the classical FEQ processed on bins $q_i^c$ at time symbol t lead to the complex signal $R[q_i^c,t]$ according to:

$$R[q_i^c,t] = H[q_i^c]A^c[t] + W[q_i^c,t]$$ [Eq. 4], wherein $1 \leq i \leq N_c$, $W[q_i^c,t]$ is the noise (e.g., zero-mean, white, complex, Gaussian, circular, random variables) with variance $(\sigma_i^c)$, $A^c[t]$ is the cluster payload (i.e., the data to be loaded in each bin of a given cluster c) with a variance $(\sigma_A^c)^2$, and $H[q_i^c]$ is the complex-valued residual coefficient. Hence, the $SNR_{FEQ}^{linear}$ is:

$$SNR_{FEQ}^{linear}[q_i^c] = \left(\frac{\sigma_A^c}{\sigma_i^c}\right)^2 |H[q_i^c]|^2.$$ [Eq. 5]

Rewriting Eq. 4 to reflect the system having $N_c$-dimensional vectors that collect the bins belonging to cluster c at time t, Eq. 4 becomes:

$$R^c[t] = A^c[t]H^c + W^c[t]$$ [Eq. 6].

If $S^c$ is defined as the noise covariance matrix, then, keeping with the noise properties of this matrix, the covariance matrix may be written as:

$$S^c = DIAG\{(\sigma_i^c)^2\}$$ [Eq. 7], and the maximum-likelihood cost function associated with the cluster payload estimation takes the form:

$$(R^c[t] - A^c[t]H^c)^T (S^c)(R^c[t] - A^c[t]H^c)$$ [Eq. 8], wherein $(\ )^T$ and $(\ )^*$ represent the transpose and the conjugate functions, respectively. From here, a straightforward derivation of the complex valued variables leads to a maximum-likelihood estimate of the cluster payload (i.e., the estimated cluster payload) to be:

$$\tilde{A}_{ML}^c[t] = \frac{R^{cT}[t](S^c)^{-1}H^{c*}}{H^{cT}(S^c)^{-1}H^{c*}}.$$ [Eq. 9]

From Eqs. 6 and 9, the estimated cluster payload becomes:

$$\hat{A}_{ML}^c[t] = A^c[t] + V^c[t]$$ [Eq. 10], wherein $V^c[t]$ is the residual noise as defined by:

$$V^c[t] = \frac{W^{cT}[t](S^c)^{-1}H^{c*}}{H^{cT}(S^c)^{-1}H^{c*}}.$$ [Eq. 11]

Since the residual noise is zero-mean, complex, Gaussian, circular with a variance defined by:

$$(\sigma_V^c)^2 = \frac{1}{H^{cT}(S^c)^{-1}H^{c*}},$$ [Eq. 12]

the maximum likelihood estimate of the cluster payload is the linear summation of the linear SNR according to:

$$SNR_{ML}^{c,linear} = (\sigma_A^c)^2 H^{cT}(S^c)^{-1}H^{c*}$$ [Eq. 13], and since:

$$(\sigma_A^c)^2 = H^{cT}(S^c)^{-1}H^{c*} = \sum_{i=1}^{N_c}(SNR_{FEQ}^{linear}[q_i^c]), \quad [\text{Eq. 14}]$$

the equality of Eq. 1 is shown to be true.

As shown through Eqs. 1 through 14, if the system sequentially adds contiguous bins together until the predefined threshold SNR is exceeded, the sum total of the individual bins forms a bin-cluster that may be used for signal transmission. Thus, once the selected bin has been added, in step 1150, to the bin-cluster, the system determines, in step 1160, whether the cluster-SNR (see Eq. 1) is greater than the predefined threshold value. If the system determines 1160 that the predefined threshold value has not been exceeded, then the system repeats the process at step 1130 and adds more bins to the bin-cluster. If, on the other hand, the system determines, in step 1160, that the predefined SNR has been met by the addition of the bins to the cluster, then the system, in step 1170 closes the cluster and, in step 1110, repeats the process until all insufficient-capacity bins have been assigned to a bin-cluster. At the end of this process, the cluster pattern has been determined for the insufficient-capacity bins in the system.

FIG. 10C is a flow chart showing a non-limiting example of the steps involved in the step of clustering the insufficient-capacity bins into sufficient-capacity bin-clusters in FIG. 9. As shown in FIG. 9, once the cluster patterns have been determined 930 at the sink site, this information is transmitted 940 to the source site so that the source processor may cluster the insufficient-capacity bins into clusters according to the cluster patterns. The logic circuit 605 (FIG. 6A) receives information that allows the system, in step 1031, to delineate between the sufficient-capacity bins and the insufficient-capacity bins. Once the bins have been delineated as either sufficient-capacity bins or insufficient-capacity bins, the sufficient-capacity bins are loaded, in step 1032, with data for data transmission. The system then receives, in step 1033, the cluster pattern at the cluster pattern receiver 607 (FIG. 6A), which allows for the clustering of the bins. Once the bins have been clustered according to the received cluster pattern, the first bin-cluster, which initially contained unloaded data, is selected in step 1034, and, in step 1035, the selected bin-cluster is loaded with data. This is done by loading each bin of the bin-cluster with the same data so that the SNR of the bin-cluster may be sufficient for data transmission according to Eq. 1. Once each bin of the selected bin-cluster has been loaded with data, the system determines, in step 1036, whether there additional bin-clusters are available for loading data. If additional bin-clusters are available, then the system selects, in step 1037, the next bin-cluster and repeats the process from step 1035. If, on the other hand, all bin-clusters have been loaded with data, then the system transmits 960 (FIG. 9) the data using both the bin-clusters and the sufficient-capacity bins.

Figure 12:
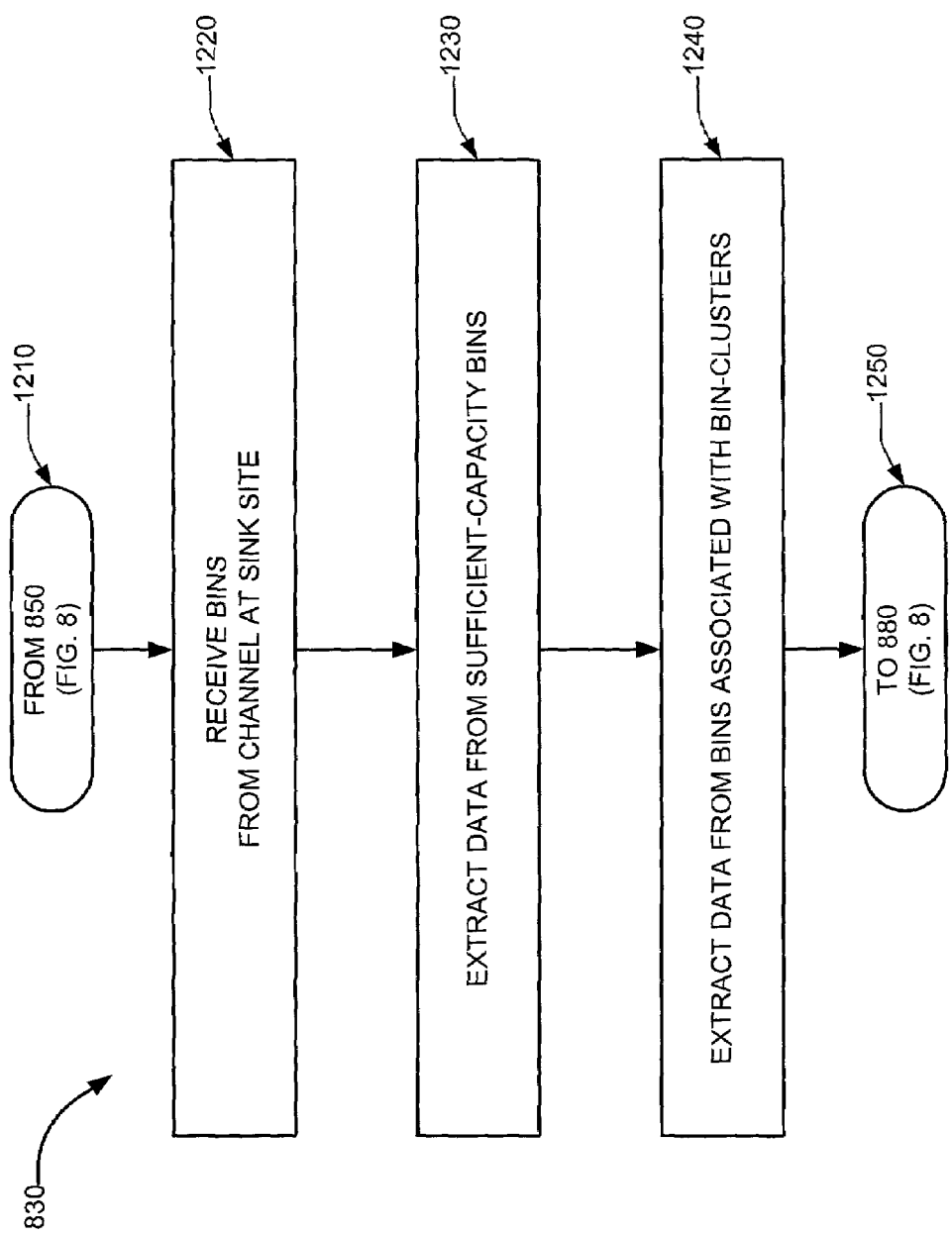
FIG. 12 is a flow chart showing a non-limiting example of the receiving step and cluster-demodulating step of FIG. 8 in greater detail.

FIG. 12 is a flow chart showing a non-limiting example of the receiving step and cluster-demodulating step of FIG. 8 in greater detail. Since data has been transmitted using sufficient-capacity bins as well as bin-clusters, the steps associated with data extraction are seen, generally, as a three-step process. In step 1220, the bins (whether associated with the bin-cluster or transmitted as sufficient-capacity bins) are received at the sink site. At this point, all the bins have data, either as sufficient-capacity bins or, alternatively, as bins belonging to bin-clusters. Once the bins are received 1220, the system extracts, in step 1230, the data from the sufficient-capacity bins in a straightforward manner (i.e., using methods known in the prior art). The data in the bin-clusters are also extracted, in step 1250, using the method described in detail in FIG. 13.

Figure 13:
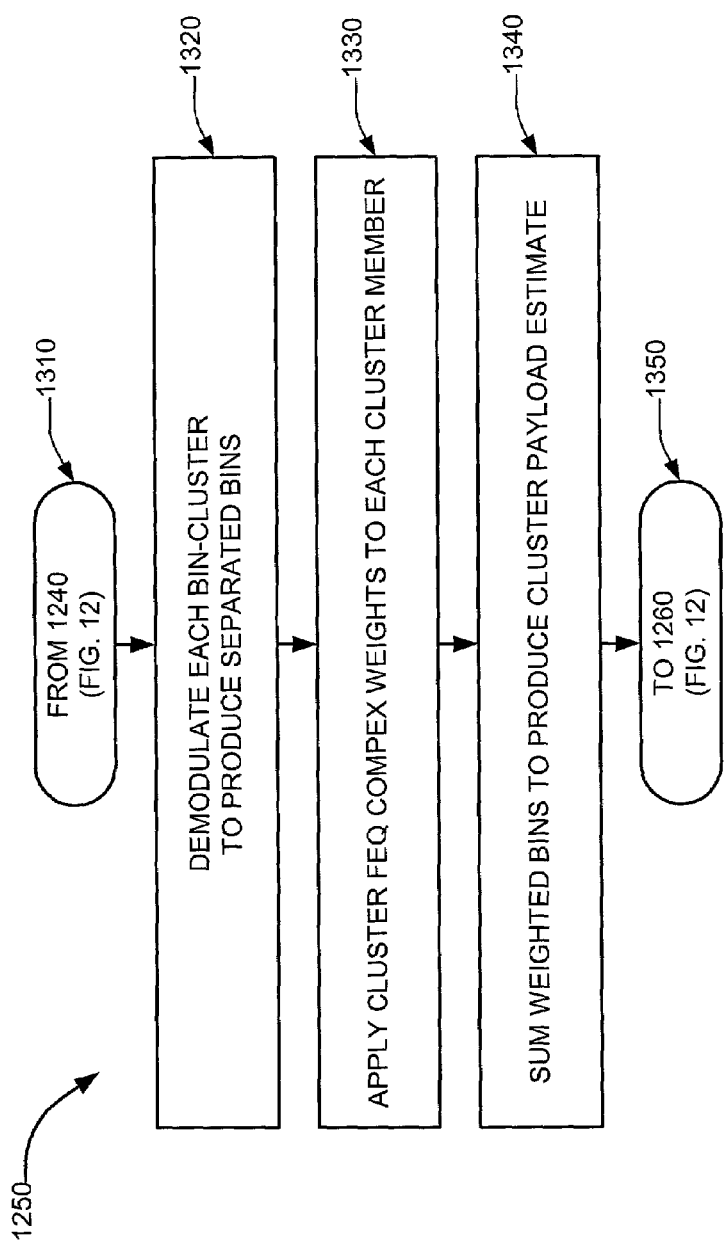
FIG. 13 is a flow chart showing a non-limiting example of the steps involved in extracting the data from the sufficient-capacity bin-clusters in FIG. 12.

FIG. 13 is a flow chart showing a non-limiting example of the steps involved in extracting the data from the sufficient-capacity bin-clusters in FIG. 12. In step 1320, each bin is separated from the bin cluster, and a phase compensation (if needed) is performed. Then, in step 1330, a cluster frequency equalization (FEQ) is applied (i.e., a complex weight is applied to each of the demodulated bins 710) in order to minimize the payload estimation error shared by all the bins that belong to the same cluster according to Eqs. 15 and 19 (see below). It is worthwhile to note that the complex weights used for the equalization need not be unit-amplitude or unit-modulus weights. Rather, the amplitude of these weights may be greater than or less than one. Once the bins have undergone cluster FEQ 1330, they are linearly summed, in step 1340, to produce the soft maximum likelihood estimate of the cluster payload that is part of the cluster payload estimation error (see Eq. 9).

The theory behind this operation is shown in Eqs. 15 through 19 below.

Since the soft cluster symbol $R^c[t]$ at time symbol t is defined as:

$$R^c[t] \triangleq \sum_{i=1}^{N_c} ((F[q_i^c,t]e^{-j\varphi_i^c})(R[q_i^c,t])), \quad [\text{Eq. 15}]$$

wherein $R[q_i^c,t]$ is the received signal, $e^{-j\varphi_i^c}$ is the phase that may be imparted to bin i to reduce the peak-to-average ratio of the signal, and $F[q_i^c,t]$ is the cluster-FEQ complex coefficients, if the complex coefficients are determinable, then the linear sum of the received bins allows for estimation of the symbol. If an a priori known symbol is transmitted from the source site to the sink site, then the system may be "trained" so that the complex coefficients that represent the phase associated with each bin may be determined. Since $F[q_i^c,t]$ may be represented as $F_i^c[t]$, and, furthermore, since the vector representation of $F_i^c[t]$ is:

$$F^c[t] = VECT\{F_i^c[t]\} \quad [\text{Eq. 16}],$$

wherein $1 \leq i \leq N_c$, the complex coefficients may be represented as:

$$F^c[t] = F^c[t-1] + \mu R^{c*}[t]E^c[t,t-1] \quad [\text{Eq. 17}]$$

in vector form or $$F_i^c[t] = F_i^c[t-1] + \mu R_i^{c*}[t]E^c[t,t-1] \quad [\text{Eq. 18}]$$

in scalar form, wherein $E^c[t,t-1]$ is the error term between subsequent iterations, and is given by:

$$E^c[t,t-1] = A^c[t] - \sum_{i=1}^{N_c}(F_i^c[t-1]e^{-j\varphi_i^c}R_i^c[t]).$$

$A^c[t]$ is the cluster payload, known during the learning phase. Once the complex coefficients have been estimated, subsequent updates follow:

$$F^c[t] = \qquad\qquad [\text{Eq. 19}]$$

$$F^c[t-1] + \mu R_i^{c^*}[t]\left(D^c[t] - \sum_{i=1}^{N_C}\left(F_i^c[t-1]e^{-j\phi_i^c}R_i^c[t]\right)\right),$$

wherein $D^c[t]$ represents the decision made for cluster c at time symbol t. As shown through Eqs. 15 through 19, the complex weights need not be unit-amplitude or unit-modulus weights, but, rather, may have an amplitude that is greater than or less than one.

Figure 14:
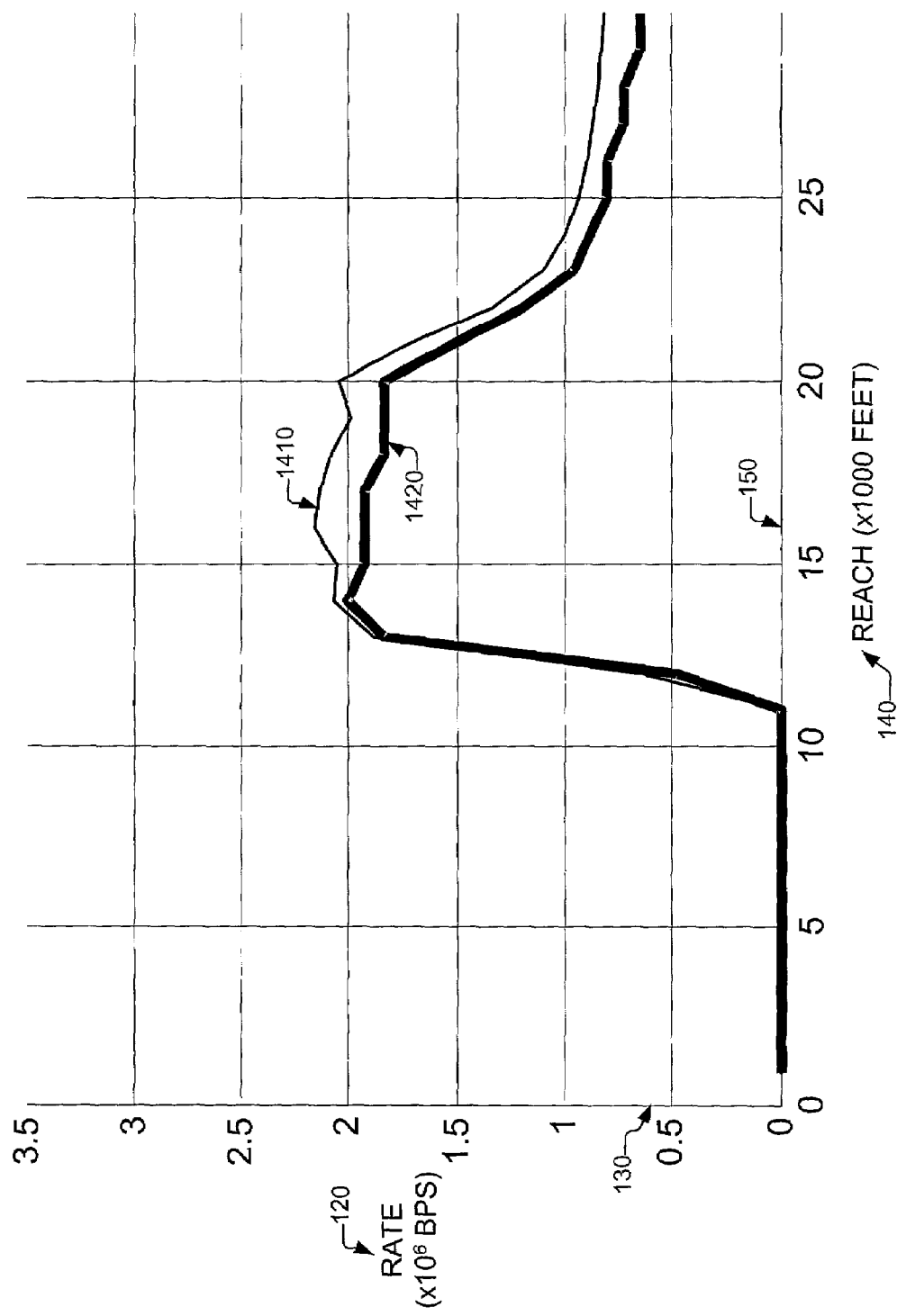
FIG. 14 is a graph showing a non-limiting example of a rate improvement that is achievable through the non-limiting example of the cluster modulating system of FIGS. 4 through 7B.

FIG. 14 is a graph showing a non-limiting example of a rate improvement that is achievable through the non-limiting example of the cluster modulating system of FIGS. 4 through 7B. Similar to FIG. 3, this graph plots the available bandwidth 120 on the y-axis 130 as a function of reach 140, which is plotted on the x-axis 150. As shown here, when data is transmitted using a cluster-modulation technique 1420, the performance approaches the theoretical upper bound 1410 because greater bandwidth is available for data transmission using the cluster-modulation technique (compare 1410 and 1420 of FIG. 14). The practical effect of this is that the reach of a system may be improved by using a cluster modulation technique because the previously unloaded bits are now used to carry payload from the source site to the sink site.

Figure 15B:
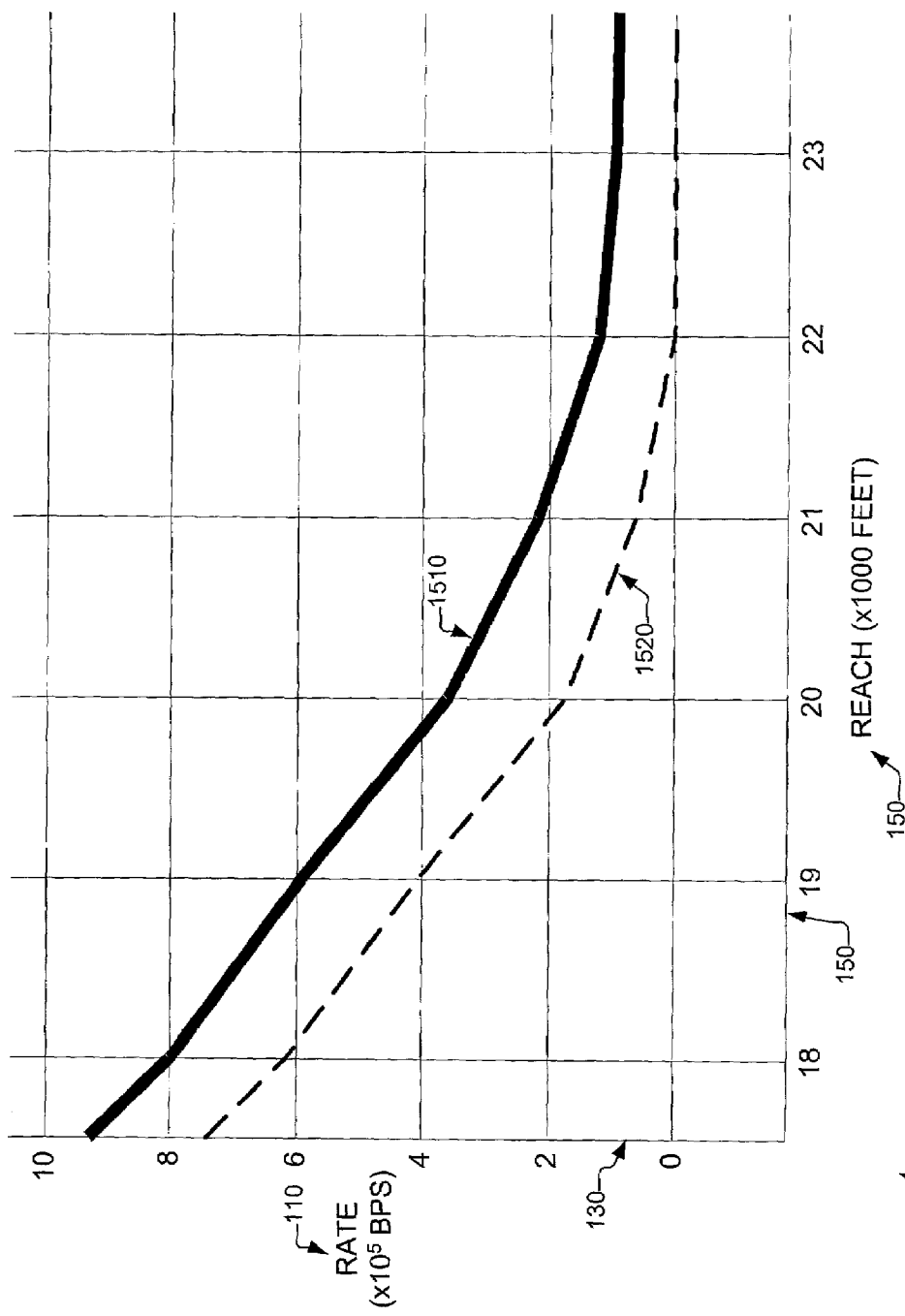
FIG. 15B is a graph showing an exploded view of the hashed box in the non-limiting example of FIG. 15A.
Figure 15C:
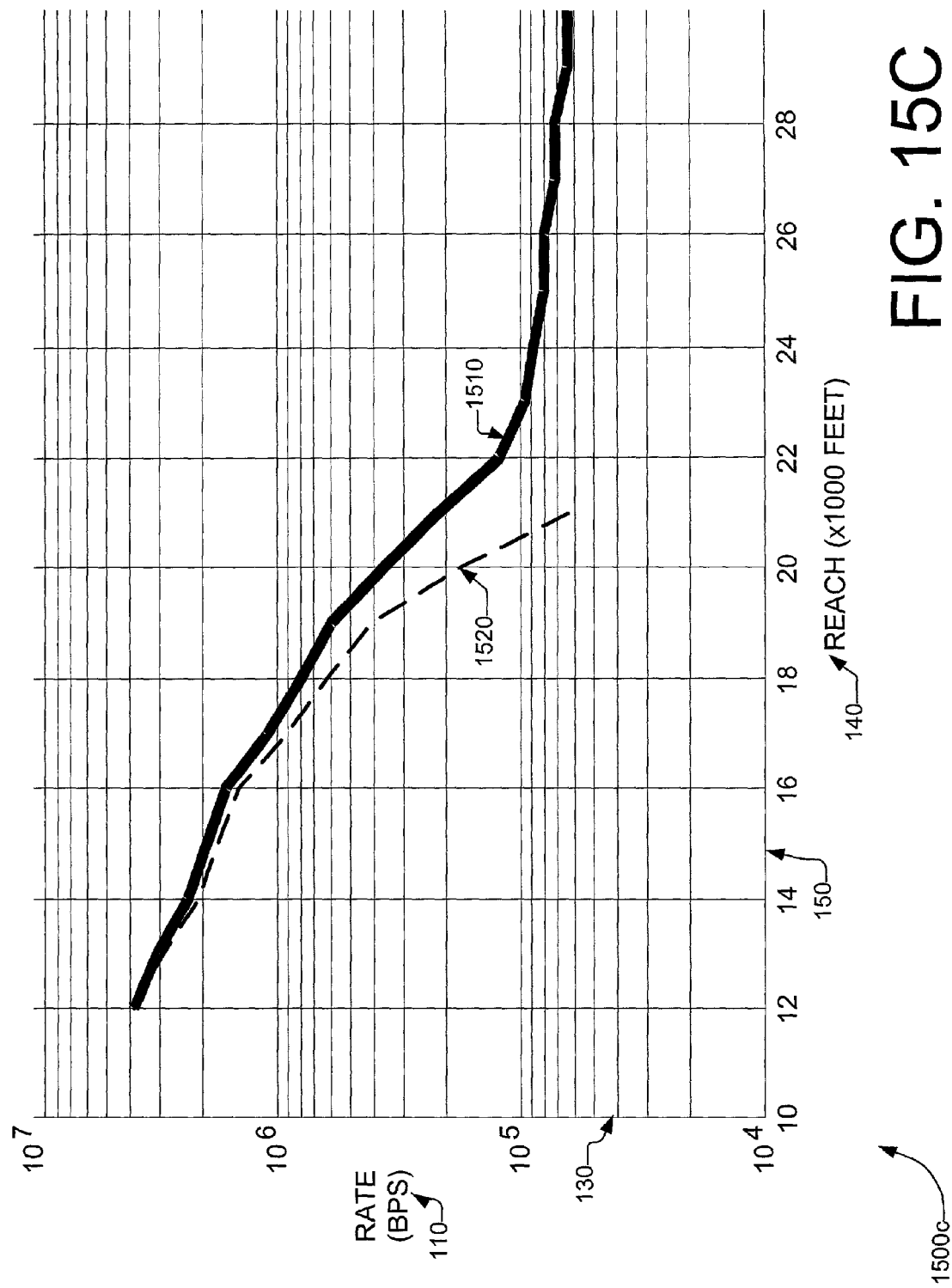
FIG. 15C is a graph showing the non-limiting example of FIG. 15A plotted on a semi-log plot.

FIGS. 15A, 15B, and 15C are graphs showing the increased reach achievable through the use of a cluster-modulation technique. As shown in those figures, the specific operating environment is a QAM4 data modulation system having a desired BER of $10^{-7}$ and noise characteristics of −140 dBm/Hz white noise. This translates to a threshold SNR of 14.5 dB in order to satisfactorily transmit data. As shown in FIGS. 15A through 15C, more than 125 kbits/sec of improvement may be seen between 13,000 feet and 18,000 feet.

Additionally, if bridged taps or other attenuation sources exist in the line, the cluster modulation technique may improve the transmission of information. Theoretical calculations show that an improvement of 230 kbits/sec is achievable for a single bridged tap in a 13,000-foot reach. If an additional bridged tap exists within the 13,000-foot reach, then a 130 kbits/sec rate improvement may be achieved.

While the system shows logic circuits configured to calculate the cluster patterns, the logic circuits of the present invention can be implemented in hardware (as shown or in other equivalent hardware means), software, firmware, or a combination thereof. In one embodiment, the logic circuits are implemented in software or firmware that is stored in a memory and that is executed by a suitable instruction execution system. However, if the logic circuits are implemented in hardware, as in the preferred embodiment, the logic components be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Although an exemplary embodiment of the present invention has been shown and described, it will be apparent to those of ordinary skill in the art that a number of changes, modifications, or alterations to the invention as described may be made, none of which depart from the spirit of the present invention. For example, while specific examples of SNR improvements are shown for specifically configured systems, it will be clear to one of ordinary skill in the art that the general concept may be translated to other systems having different levels of noise, different BER, different modulation technique, etc. Additionally, while the method shown in FIGS. 8 through 13 provides a maximum likelihood estimate of the soft symbols, it will be clear to one of ordinary skill in the art that other analogous methods may be used to achieve coherent addition of out-of-phase signals. Furthermore, while a Fourier-based system is used to better illustrate the invention, it will be clear that systems using other bases (e.g., wavelet transform-based systems, Hartley transform-based systems, Haar transform-based systems, Mallat transform-based systems, trigonometric-based transform systems, Walsh transform-based systems, Hadamard transform-based systems, Walsh-Hadamard transform-based systems, discrete cosine transform (DCT) based systems, non-trigonometric transforms, etc.) are also compatible with the invention. All such changes, modifications, and alterations should therefore be seen as within the scope of the present invention.

We claim:

1. In data transmission systems, a method for increasing payload capacities comprising the steps of:
    determining a noise floor of a signal transmission system having a plurality of data bins;
    determining a type of data modulation in the signal transmission system;
    defining a desired bit-error rate (BER) associated with the signal transmission system;
    calculating a linear signal-to-noise ratio (SNR) of each individual data bin of the plurality of data bins, the SNR being a function of the determined noise floor, the determined type of data modulation, and the defined desired BER;
    comparing the calculated SNR of each individual data bin of the plurality of data bins to a predefined threshold SNR;
    defining individual data bins in the plurality of data bins as sufficient-capacity data bins having sufficient capacity for data transmission in response to the calculated SNR of the individual data bin being greater than the predefined threshold SNR;
    defining individual data bins in the plurality of data bins as insufficient-capacity data bins having insufficient-capacity for data transmission in response to the calculated SNR of the individual data bin being not greater than the predefined threshold SNR;
    loading the defined sufficient-capacity data bins with data for data transmission;
    clustering the defined insufficient-capacity data bins into bin-clusters having sufficient SNR for data transmission; and
    transmitting data using the bin-clusters and the sufficient-capacity data bins.

2. The method of claim 1, further comprising the steps of:
receiving the transmitted bin-clusters and sufficient-capacity data bins;
extracting data from the sufficient-capacity data bins to produce desired data;
demodulating each bin-cluster to produce separated data bins;
applying a complex weight to each of the separated data bins to produce weighted data bins; and
summing the weighted data bins to produce desired data.

3. In data transmission systems, a method for increasing payload capacities comprising the steps of:
modulating data bins to produce bin-clusters, wherein a signal-to-noise ratio (SNR) of each individual data bin of a plurality of data bins is computed, the data bins are selectively clustered into bin-clusters having sufficient SNR for data transmission, wherein the computed SNR of each individual data bin of a plurality of data bins is compared with a predefined threshold SNR, and the individual data bins having a computed SNR not greater than the predefined threshold SNR are sequentially added to a bin-cluster until the linear sum of the SNR of each sequentially added individual data bin exceeds the predefined threshold SNR;
loading the bin-clusters with data;
transmitting the loaded bin-clusters;
receiving the transmitted bin-clusters; and
extracting data from the received bin-clusters.

4. The method of claim 3, wherein the data transmission system is a Fourier transform-based data transmission system.

5. The method of claim 3, wherein the data transmission system is a wavelet transform-based data transmission system.

6. The method of claim 3, wherein the data transmission system is a Haar transform-based data transmission system.

7. The method of claim 3, wherein the data transmission system is a Hadamard transform-based data transmission system.

8. The method of claim 3, wherein the data transmission system is a Walsh transform-based data transmission system.

9. The method of claim 3, wherein the data transmission system is a Walsh-Hadamard transform-based data transmission system.

10. The method of claim 3, wherein the data transmission system is a Mallat transform-based data transmission system.

11. The method of claim 3, wherein the data transmission system is a Hartley transform-based data transmission system.

12. The method of claim 3, wherein the data transmission system is a discrete cosine transform-based data transmission system.

13. The method of claim 3, wherein the data transmission system is a non-wavelet transform-based data transmission system.

14. The method of claim 3, wherein the data transmission system is a trigonometric transform-based data transmission system.

15. The method of claim 3, wherein the data transmission system is a non-trigonometric transform-based data transmission system.

16. The method of claim 3, wherein the step of computing the SNR of each of the plurality of data bins comprises the steps of:
determining a noise floor of a signal transmission system;
determining a type of data modulation in the signal transmission system;
defining a desired bit-error rate (BER) associated with the signal transmission system; and
calculating a signal-to-noise ratio (SNR) of each individual data bin of the plurality of data bins as a function of the determined noise floor, the determined type of data modulation, and the defined desired BER.

17. The method of claim 3, further comprising the steps of:
defining individual data bins of the plurality of data bins as sufficient-capacity data bins in response to the computed SNR of the individual data bin being greater than the predefined threshold of the comparing step; and
defining individual data bins of the plurality of data bins as insufficient-capacity data bins in response to the computed SNR of the individual data bin being not greater than the predefined threshold of the comparing step.

18. The method of claim 17, further comprising the steps of:
beginning a cluster pattern;
sequentially adding individual data bins having a computed SNR not greater than the predefined threshold SNR to the new cluster pattern until the linear sum of the SNR of each sequentially added individual data bin exceeds the predefined threshold SNR; and
closing the cluster pattern in response to the added computed SNR exceeding the predefined threshold SNR.

19. The method of claim 18, further comprising the step of selectively clustering the data bins comprises the step of loading each individual data bin of the cluster pattern with the same data.

20. The method of claim 3, wherein the step of extracting data comprises the steps of:
separating each bin-cluster into individual data bins;
applying complex weights to each individual data bin to produce weighted data bins; and
summing the weighted data bins to produce data.

21. The method of claim 20, wherein the complex weights are indicative of a maximum-likelihood estimate of the cluster payload.

22. The method of claim 20, wherein the complex weights have a unit amplitude.

23. The method of claim 20, wherein the complex weights have a non-unit amplitude.

24. In data transmission systems, a system comprising:
means for modulating data bins to produce bin-clusters, the means for modulating data bins having means for computing a signal-to-noise ratio (SNR) of each individual data bin of a plurality of data bins, means for comparing the computed SNR of each individual data bin of a plurality of data bins with a predefined threshold SNR and means for sequentially adding individual data bins having a computed SNR not greater than a predefined threshold SNR to a bin-cluster until the linear sum of the SNR of each sequentially added individual data bin exceeds the predefined threshold SNR;
means for loading the bin-clusters with data;
means for transmitting the loaded bin-clusters;
means for receiving the transmitted bin-clusters; and
means for extracting data from the received bin-clusters.

25. The system of claim 24, wherein the means for computing the SNR of each of the plurality of data bins comprises:

means for determining a noise floor of a signal transmission system;
means for determining a type of data modulation in the signal transmission system;
means for defining a desired bit-error rate (BER) associated with the signal transmission system; and
means for calculating a signal-to-noise ratio (SNR) of each individual bin of the plurality of data bins as a function of the determined noise floor, the determined type of data modulation, and the defined desired BER.

26. The system of claim 24, further comprising:
means for defining individual data bins of the plurality of data bins as sufficient-capacity data bins in response to the computed SNR being greater than the predefined threshold of the comparing step; and
means for defining individual data bins of the plurality of data bins as insufficient-capacity data bins in response to the computed SNR being not greater than the predefined threshold of the comparing step.

27. The system of claim 26, further comprising:
means for beginning a new cluster pattern;
means for sequentially adding individual data bins having a computed SNR not greater than the predefined threshold SNR to the new cluster pattern until the linear sum of the SNR of each sequentially added individual data bin exceeds the predefined threshold SNR; and
means for closing the cluster pattern in response to the added computed SNR exceeding the predefined threshold SNR.

28. The system of claim 27, further comprising means for loading each individual data bin of the cluster pattern with the same data.

29. The system of claim 24, wherein the means for extracting data comprises:
means for separating each bin-cluster into individual data bins;
means for applying complex weights to each individual data bin to produce weighted data bins; and
means for summing the weighted data bins to produce data.

30. In data transmission systems, a system comprising:
a modulation device configured to modulate data bins to produce bin-clusters, the modulation device having a bin signal-to-noise ratio (SNR) calculator configured to compute the SNR of each individual data bin of a plurality of data bins, a comparator configured to compare the computed SNR of each individual data bin of a plurality of data bins with a predefined threshold SNR, and logic configured to sequentially add individual data bins having a computed SNR not greater than the predefined threshold SNR to a bin-cluster until the linear sum of the SNR of each sequentially added individual data bin exceeds the predefined threshold SNR;
a bin loader configured to load the bin-clusters with data;
a transmitter configured to transmit the loaded bin-clusters;
a receiver configured to receive the transmitted bin-clusters; and
a demodulation device configured to extract data from the received bin-clusters.

31. The system of claim 30, wherein the bin SNR calculator is configured to calculate a signal-to-noise ratio (SNR) of each individual bin of the plurality of data bins as a function of the determined noise floor, the determined type of data modulation, and a defined desired BER.

32. The system of claim 30, further comprising a bin designator configured to define individual data bins of the plurality of data bins as sufficient-capacity data bins in response to the computed SNR being greater than the predefined threshold of the compare step, the bin designator further configured to define individual data bins of the plurality of data bins as insufficient-capacity data bins in response to the computed SNR being not greater than the predefined threshold of the compare step.

33. The system of claim 32, further comprising:
logic configured to begin a new cluster pattern;
logic configured to sequentially add individual data bins have a computed SNR not greater than the predefined threshold SNR to the new cluster pattern until the linear sum of the SNR of each sequentially added individual data bin exceeds the predefined threshold SNR; and
logic configured to close the cluster pattern in response to the added computed SNR exceeding the predefined threshold SNR.

34. The system of claim 30, further configured to load each individual data bin of the cluster pattern with the same data.

35. The system of claim 30, wherein the demodulation device comprises:
a cluster separator configured to separate each bin-cluster into individual data bins;
a cluster frequency equalizer configured to apply complex weights to each individual data bin to produce weighted data bins; and
a linear summing circuit configured to sum the weighted data bins to produce data.

36. A system for transmitting data comprising:
a bin signal-to-noise ratio (SNR) calculator configured to calculate a SNR of individual data bins in a plurality of bins;
a comparator configured to compare the calculated SNR of the individual data bins to a predefined threshold SNR;
a bin designator configured to selectively designate the individual bins as sufficient-capacity bins in response to the calculated SNR being greater than the predefined threshold SNR, the bin designator further configured to selectively designate the individual bins as insufficient-capacity bins in response to the calculated SNR being not greater than the predefined threshold SNR;
a cluster modulator configured to cluster the insufficient-capacity bins into bin-clusters for data transmission;
a cluster separator configured to separate the clustered bin-clusters into individual data bins;
a cluster frequency equalizer configured to apply complex weights to each individual data bins to produce weighted data bins; and
a linear summing circuit configured to sum the weighted data bins to produce desired data.

37. A system for transmitting data comprising:
a modulation device configured to cluster individual data bins having a low signal-to-noise ratio (SNR) to produce a bin-cluster having a higher SNR than the individual data bins; and
a demodulation device configured to produce data from the bin-clusters.

38. The system of claim 37, wherein the data transmission system is a Fourier transform-based data transmission system.

39. The system of claim 37, wherein the data transmission system is a wavelet transform-based data transmission system.

40. The system of claim 37, wherein the data transmission system is a Haar transform-based data transmission system.

41. The system of claim 37, wherein the data transmission system is a Hadamard transform-based data transmission system.

42. The system of claim 37, wherein the data transmission system is a Walsh transform-based data transmission system.

43. The system of claim 37, wherein the data transmission system is a Walsh-Hadamard transform-based data transmission system.

44. The system of claim 37, wherein the data transmission system is a Mallat transform-based data transmission system.

45. The system of claim 37, wherein the data transmission system is a Hartley transform-based data transmission system.

46. The system of claim 37, wherein the data transmission system is a discrete cosine transform-based data transmission system.

47. The system of claim 37, wherein the data transmission system is a non-wavelet transform-based data transmission system.

48. The system of claim 37, wherein the data transmission system is a trigonometric transform-based data transmission system.

49. The system of claim 37, wherein the data transmission system is a non-trigonometric transform-based data transmission system.

50. The system of claim 37, wherein the modulation device comprises:
   a SNR calculator configured to calculate a SNR of individual data bins;
   a comparator configured to compare the calculated SNR with a predefined threshold SNR;
   a bin designator configured to selectively designate the individual bins as sufficient-capacity bins in response to the calculated SNR being greater than the predefined threshold SNR, the bin designator further configured to selectively designate the individual bins as insufficient-capacity bins in response to the calculated SNR being not greater than the predefined threshold SNR; and
   a logic circuit configured sequentially add insufficient-capacity bins until the linear sum of the individual bins exceeds the predefined threshold SNR.

51. The system of claim 37, wherein the demodulation device comprises a cluster separator configured to separate bin-clusters into individual data bins.

52. The system of claim 51, further comprising a cluster frequency equalizer configured to apply a complex weight to the individual data bins to produce weighted data bins.

53. The system of claim 52, wherein the complex weight is indicative of a maximum-likelihood estimate of the cluster payload.

54. The system of claim 52, wherein the complex weight has a unit amplitude.

55. The system of claim 52, wherein the complex weight has a non-unit amplitude.

56. The system of claim 52, further comprising a linear summing circuit configured to selectively add the weighted data bins to produce data.

57. The system of claim 37, wherein the demodulation device comprises:
   a SNR calculator configured to calculate a SNR of individual data bins;
   a comparator configured to compare the calculated SNR with a predefined threshold SNR;
   a bin designator configured to selectively designate the individual bins as sufficient-capacity bins in response to the calculated SNR being greater than the predefined threshold SNR, the bin designator further configured to selectively designate the individual bins as insufficient-capacity bins in response to the calculated SNR being not greater than the predefined threshold SNR; and
   a logic circuit configured sequentially add insufficient-capacity bins until the linear sum of the individual bins exceeds the predefined threshold SNR.

* * * * *